(12) United States Patent
Yang et al.

(10) Patent No.: US 12,513,402 B2
(45) Date of Patent: Dec. 30, 2025

(54) IMAGE PROCESSING METHOD AND ELECTRONIC DEVICE FOR SUPPORTING SAME

(71) Applicant: SAMSUNG ELECTRONICS CO., LTD., Suwon-si (KR)

(72) Inventors: Kyungdong Yang, Suwon-si (KR); Soonae Kim, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 92 days.

(21) Appl. No.: 18/496,325

(22) Filed: Oct. 27, 2023

(65) Prior Publication Data
US 2024/0056687 A1 Feb. 15, 2024

Related U.S. Application Data

(63) Continuation of application No. PCT/KR2022/005902, filed on Apr. 26, 2022.

(30) Foreign Application Priority Data

Apr. 28, 2021 (KR) .................. 10-2021-0055108

(51) Int. Cl.
*H04N 23/695* (2023.01)
*G02B 7/18* (2021.01)
(Continued)

(52) U.S. Cl.
CPC ............ *H04N 23/695* (2023.01); *G02B 7/18* (2013.01); *G06T 7/70* (2017.01); *G06V 10/25* (2022.01);
(Continued)

(58) Field of Classification Search
CPC ...... H04N 23/611; H04N 23/57; H04N 23/61; H04N 23/695; G03B 17/04; G06V 10/147; G06B 10/25; G02B 7/18
(Continued)

(56) References Cited

U.S. PATENT DOCUMENTS 8,614,743 B2 12/2013 Winsor
9,285,566 B2 3/2016 Chan et al.
(Continued)

FOREIGN PATENT DOCUMENTS

JP 2009-077405 4/2009
KR 10-2009-0078463 7/2009
(Continued)

OTHER PUBLICATIONS

YouTube video, "A Friendly SEM Who Reads Samsung Electro-Mechanics Press Realease I Dual Folded Camera Module", Mar. 1, 2021, 10 pages.
(Continued)

*Primary Examiner* — Xi Wang
(74) *Attorney, Agent, or Firm* — Nixon & Vanderhye, P.C.

(57) ABSTRACT

An electronic device disclosed herein includes: a display, a memory, a processor, and a camera, the camera includes a lens unit including a lens, a prism rotatable in a first direction or a second direction, a driving unit including at least one coil configured to move the prism, a magnetic body coupled to the prism, a sensor unit including a sensor configured to detect a first amount of rotation of the prism in the first direction or a second amount of rotation thereof in the second direction, and an image sensor configured to generate an electrical signal using light passing through the lens unit and the prism, wherein the processor is configured to: determine a first region of interest (ROI) for execution of a (Continued)

specified function using the camera, determine the first amount of rotation or the second amount of rotation using a sensing value of the sensor unit, and determine a second region of interest by correcting the first region of interest of the camera using the first amount of rotation or the second amount of rotation.

19 Claims, 13 Drawing Sheets

(51) Int. Cl.
*G06T 7/70* (2017.01)
*G06V 10/25* (2022.01)
*H04N 23/61* (2023.01)

(52) U.S. Cl.
CPC ......... *H04N 23/61* (2023.01); *G06V 2201/07* (2022.01)

(58) Field of Classification Search
USPC ....................................................... 348/143
See application file for complete search history.

(56) References Cited

U.S. PATENT DOCUMENTS

| | | |
|---|---|---|
| 9,396,529 B2 | 7/2016 | Tsubota et al. |
| 9,632,327 B2 | 4/2017 | Chan et al. |
| 9,836,829 B2 | 12/2017 | Tsubota et al. |
| 10,126,633 B2 | 11/2018 | Avivi et al. |
| 10,162,191 B2 | 12/2018 | Chan et al. |
| 10,366,477 B2 | 7/2019 | Tsubota et al. |
| 10,372,022 B2 | 8/2019 | Avivi et al. |
| 10,645,286 B2 | 5/2020 | Fridman et al. |
| 10,712,581 B2 | 7/2020 | Chan et al. |
| 10,969,652 B2 | 4/2021 | Miller et al. |
| 11,086,099 B2 | 8/2021 | Lim et al. |
| 11,347,076 B2 | 5/2022 | Chan et al. |
| 11,609,411 B2 | 3/2023 | Byon et al. |
| 11,671,711 B2 | 6/2023 | Fridman et al. |
| 2009/0079824 A1* | 3/2009 | Winsor .................. H04N 23/58 348/143 |
| 2016/0292833 A1 | 10/2016 | Tsubota et al. |
| 2019/0212632 A1 | 7/2019 | Miller et al. |
| 2020/0319439 A1 | 10/2020 | Byon et al. |
| 2021/0048605 A1 | 2/2021 | Lim et al. |
| 2021/0223662 A1 | 7/2021 | Miller et al. |
| 2022/0004018 A1* | 1/2022 | Kang ...................... G02B 3/14 |

FOREIGN PATENT DOCUMENTS

| | | |
|---|---|---|
| KR | 10-2016-0042066 | 4/2016 |
| KR | 10-2018-0007570 | 1/2018 |
| KR | 10-2018-0031068 | 3/2018 |
| KR | 10-2019-0117644 | 10/2019 |
| KR | 10-2020-0053958 | 5/2020 |
| KR | 10-2020-0097766 | 8/2020 |
| KR | 10-2131597 | 8/2020 |
| KR | 10-2020-0118709 | 10/2020 |
| KR | 10-2021-0019787 | 2/2021 |
| KR | 10-2021-0030230 | 3/2021 |

OTHER PUBLICATIONS

International Search Report dated Aug. 11, 2022 in PCT/KR2022/005902, 5 pages.
Written opinion dated Aug. 11, 2022 in PCT/KR2022/005902, 3 pages.
Action dated Jun. 5, 2025 in Korean Application No. 10-2021-0055108 and English-language.

* cited by examiner

701

| POSITION | FIRST DIRECTION (E.G.: yaw) | | SECOND DIRECTION (E.G.: pitch) | |
|---|---|---|---|---|
| | FIRST SENSING VALUE (code) | FIRST AMOUNT OF ROTATION (deg) | SECOND SENSING VALUE (code) | SECOND AMOUNT OF ROTATION (deg) |
| 1 | 50 | 17.8 | 50 | 5.9 |
| 2 | 2050 | 0.5 | 50 | 5.9 |
| 3 | 4050 | 15.1 | 50 | 5.9 |
| 4 | 50 | 15.5 | 1850 | 0 |
| 5 | 2050 | 0.4 | 1850 | 0 |
| 6 | 4050 | 15.8 | 1850 | 0 |
| 7 | 50 | 15.4 | 4050 | 7.6 |
| 8 | 1250 | 1.6 | 4050 | 7.6 |
| 9 | 2650 | 4.3 | 4050 | 7.6 |
| 10 | 4050 | 15.5 | 4050 | 7.6 |

FIG.7

IMAGE PROCESSING METHOD AND ELECTRONIC DEVICE FOR SUPPORTING SAME

CROSS-REFERENCE TO RELATED APPLICATIONS

This application is a continuation of International Application No. PCT/KR2022/005902 designating the United States, filed on Apr. 26, 2022, in the Korean Intellectual Property Receiving Office and claiming priority to Korean Patent Application No. 10-2021-0055108, filed on Apr. 28, 2021, in the Korean Intellectual Property Office, the disclosures of each of which are incorporated by reference herein in their entireties.

BACKGROUND

Field

The disclosure relates to an image processing method and an electronic device for supporting the same.

Description of Related Art

Electronic devices may be equipped with a camera (or camera module), and may take pictures or videos using the camera. In recent years, electronic devices equipped with a camera capable of changing a direction to scan a subject have been released. For example, for a folded or foldable camera, the thickness of the camera may be reduced through a folded or foldable structure and an object may be scanned by movement of an internal prism. For another example, a camera of an electronic device may scan an object by moving or rotating the whole or part of an optical system.

The camera may include a reflective mirror or prism for changing a traveling direction of light therein. Light passing through a lens unit may be changed in direction through the reflective mirror or a prism and transmitted to an image sensor. The reflective mirror or prism may rotate (or move) in a plurality of directions (e.g., a yaw direction or a pitch direction), and thus the camera module may scan a subject.

Alternatively, the whole or part of the optical system of the camera may rotate (or move) in a plurality of directions (e.g., the yaw direction or the pitch direction) through a driving unit, and in this way, an object may be scanned.

An electronic device may include a folded camera module (or a folded camera structure). The folded camera module may include a reflective mirror or prism for changing a traveling direction of light therein. If the movement of the reflective mirror or prism is within a relatively small range (e.g., less than +/-1 degree in the pitch direction or yaw direction), the distortion and rotation of a subject occurring in an image are small and thus correction may not be necessary. On the other hand, if distortion or tilting of the subject occurs due to rotation for changing a composition, the electronic device may reduce the size of a region of interest to reduce a background region, and accordingly, 3A (automatic focus (AF), automatic exposure (AE), automatic white-balance (AWB)) errors may be reduced.

The folded camera module supports a scan function, and so when the amount of rotation (or amount of movement) of the prism exceeds a specified range (e.g., a pitch direction (+9 degrees to -9 degrees) or a yaw direction (+21 degrees to -21 degrees)), a distortion level or a rotation level of a subject generated in an image may be large due to the amount of rotation (or amount of movement). When the electronic device extracts data for performing a specified function (e.g., 3A) in a region of interest (ROI) in which distortion or rotation of the subject is not reflected, background data rather than subject data may be extracted.

In this case, an error may occur in 3A (AE, AF, AWB) processing because the actual shape of the subject and the shape of the subject acquired by the camera image sensor are different. If the subject face is tilted, a background other than a face is included in the region of interest, and appropriate exposure may fail or white balance (WB) based on face detection (hereinafter referred to as PD) may become inaccurate. Alternatively, when the electronic device performs AF, image blur that becomes AF occurs in the background.

The electronic device may include a camera module in which all or part of an optical system is able to rotate (or move) in a plurality of directions (e.g., a yaw direction or a pitch direction). When the amount of rotation (or movement) of the optical system exceeds a specified range (e.g., the pitch direction (+9 degrees to -9 degrees) or the yaw direction (+21 degrees to -21 degrees)), a distortion level or a rotation level of a subject generated in an image may become large due to the amount of rotation (or amount of movement) of the camera module.

SUMMARY

Embodiments of the disclosure may provide an electronic device that detects the amount of rotation (or amount of movement) of the camera module, corrects a region of interest based on the detected amount of movement, and performs a specified function (e.g., 3A, or exposure setting or WB based on face detection).

According to an example embodiment of the present disclosure, there is provided an electronic device including: a display, a memory, a processor, and a foldable camera, in which the foldable camera includes a lens unit including a lens, a prism rotatable in a first direction or a second direction, a driving unit including at least one coil configured to move the prism, a magnetic body coupled to the prism, a sensor unit comprising a sensor configured to detect a first amount of rotation of the prism in the first direction or a second amount of rotation thereof in the second direction, and an image sensor configured to generate an electrical signal using light passing through the lens unit and the prism, wherein the processor is configured to: determine a first region of interest (ROI) for execution of a specified function using the foldable camera, determine the first amount of rotation or the second amount of rotation using a sensing value of the sensor unit, and determine a second region of interest by correcting the first region of interest of the foldable camera using the first amount of rotation or the second amount of rotation.

An electronic device according to various example embodiments disclosed herein may detect the amount of rotation (or amount of movement) of a camera module and correct a region of interest based on the detected amount of rotation (or amount of movement). The electronic device may improve performance for execution of a specified function (e.g., 3A, or exposure setting or WB based on face detection) through the corrected region of interest.

The electronic device according to various example embodiments disclosed herein may compare a sensing value of a Hall sensor with a pre-stored table to determine the amount of rotation of a prism in a yaw direction or in a pitch direction.

BRIEF DESCRIPTION OF THE DRAWINGS

The above and other aspects, features and advantages of certain embodiments of the present disclosure will be more apparent from the following detailed description, taken in conjunction with the accompanying drawings, in which:

FIG. 7 is a table in which rotation angles of the prism are matched with sensing values of a sensor unit according to various embodiments;

With respect to the description of the drawings, the same or similar reference signs may be used for the same or similar elements.

DETAILED DESCRIPTION

Figure 1:
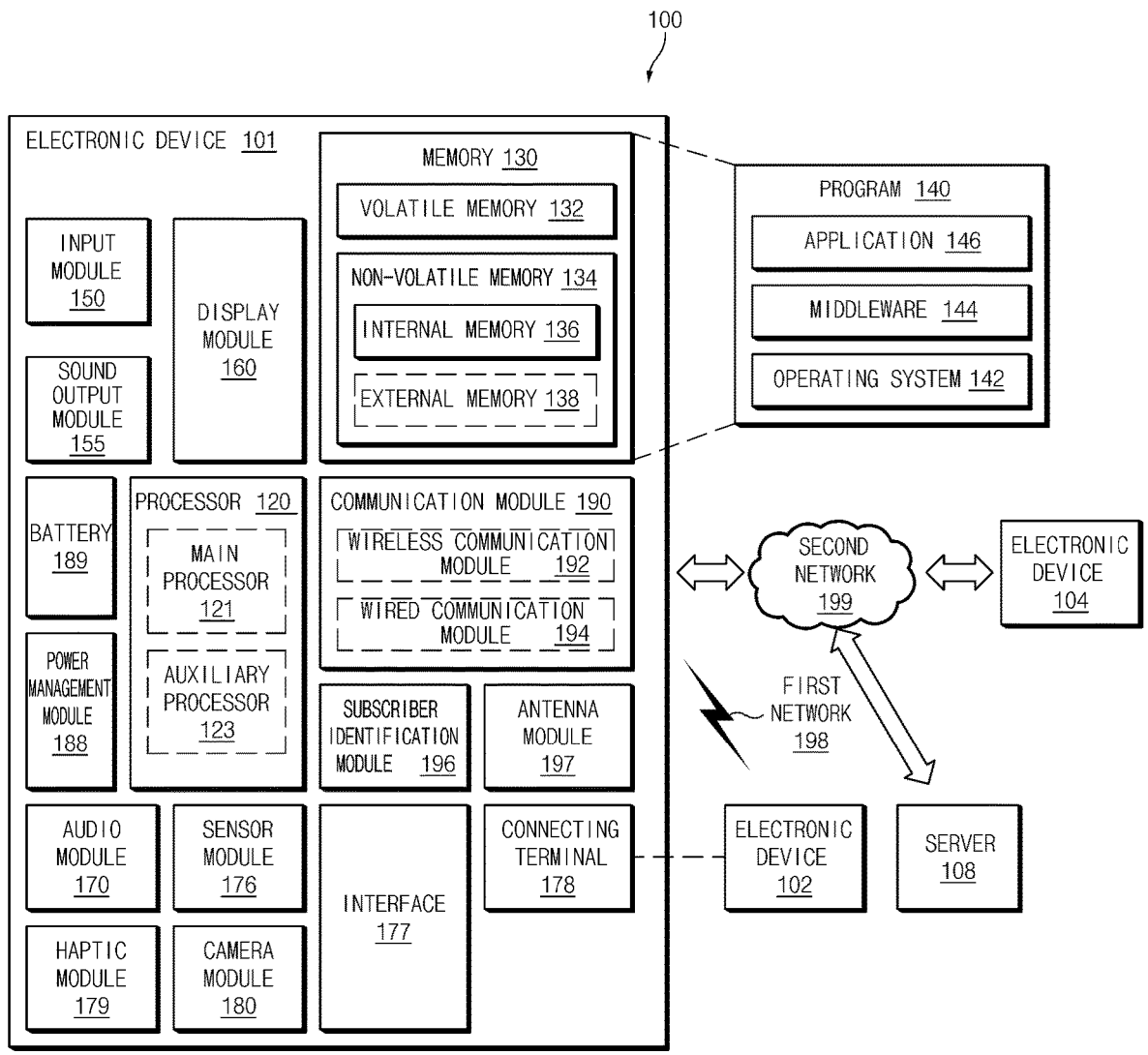
FIG. 1 is a block diagram illustrating an example electronic device in a network environment according to various embodiments.

Hereinafter, various example embodiments of the present disclosure will be described in greater detail with reference to the accompanying drawings. However, this is not intended to limit the present disclosure to specific embodiments, and it is to be understood to include various modifications, equivalents, and/or alternatives of embodiments of the present disclosure. With regard to the description of the drawings, similar reference numerals may be used to refer to similar elements.

FIG. 1 is a block diagram illustrating an example electronic device 101 in a network environment 100 according to various embodiments. Referring to FIG. 1, the electronic device 101 in the network environment 100 may communicate with an electronic device 102 via a first network 198 (e.g., a short-range wireless communication network), or at least one of an electronic device 104 or a server 108 via a second network 199 (e.g., a long-range wireless communication network). According to an embodiment, the electronic device 101 may communicate with the electronic device 104 via the server 108. According to an embodiment, the electronic device 101 may include a processor 120, memory 130, an input module 150, a sound output module 155, a display module 160, an audio module 170, a sensor module 176, an interface 177, a connecting terminal 178, a haptic module 179, a camera module 180, a power management module 188, a battery 189, a communication module 190, a subscriber identification module (SIM) 196, and/or an antenna module 197. In various embodiments, at least one of the components (e.g., the connecting terminal 178) may be omitted from the electronic device 101, or one or more other components may be added in the electronic device 101. In various embodiments, some of the components (e.g., the sensor module 176, the camera module 180, or the antenna module 197) may be implemented as a single component (e.g., the display module 160).

The processor 120 may execute, for example, software (e.g., a program 140) to control at least one other component (e.g., a hardware or software component) of the electronic device 101 coupled with the processor 120, and may perform various data processing or computation. According to an embodiment, as at least part of the data processing or computation, the processor 120 may store a command or data received from another component (e.g., the sensor module 176 or the communication module 190) in volatile memory 132, process the command or the data stored in the volatile memory 132, and store resulting data in non-volatile memory 134. According to an embodiment, the processor 120 may include a main processor 121 (e.g., a central processing unit (CPU) or an application processor (AP)), or an auxiliary processor 123 (e.g., a graphics processing unit (GPU), a neural processing unit (NPU), an image signal processor (ISP), a sensor hub processor, or a communication processor (CP)) that is operable independently from, or in conjunction with, the main processor 121. For example, when the electronic device 101 includes the main processor 121 and the auxiliary processor 123, the auxiliary processor 123 may be adapted to consume less power than the main processor 121, or to be specific to a specified function. The auxiliary processor 123 may be implemented as separate from, or as part of the main processor 121.

The auxiliary processor 123 may control at least some of functions or states related to at least one component (e.g., the display module 160, the sensor module 176, or the communication module 190) among the components of the electronic device 101, instead of the main processor 121 while the main processor 121 is in an inactive (e.g., sleep) state, or together with the main processor 121 while the main processor 121 is in an active state (e.g., executing an application). According to an embodiment, the auxiliary processor 123 (e.g., an image signal processor or a communication processor) may be implemented as part of another component (e.g., the camera module 180 or the communication module 190) functionally related to the auxiliary processor 123. According to an embodiment, the auxiliary processor 123 (e.g., the neural processing unit) may include a hardware structure specified for artificial intelligence model processing. An artificial intelligence model may be generated by machine learning. Such learning may be performed, e.g., by the electronic device 101 where the artificial intelligence is performed or via a separate server (e.g., the server 108). Learning algorithms may include, but are not limited to, e.g., supervised learning, unsupervised learning, semi-supervised learning, or reinforcement learning. The artificial intelligence model may include a plurality of artificial neural network layers. The artificial neural network may be a deep neural network (DNN), a convolutional neural network (CNN), a recurrent neural network (RNN), a restricted boltzmann machine (RBM), a deep belief network (DBN), a bidirectional recurrent deep neural network (BRDNN), deep Q-network or a combination of two or more thereof but is not limited thereto. The artificial intelligence model may, additionally or alternatively, include a software structure other than the hardware structure.

The memory 130 may store various data used by at least one component (e.g., the processor 120 or the sensor module 176) of the electronic device 101. The various data may include, for example, software (e.g., the program 140) and input data or output data for a command related thereto. The memory 130 may include the volatile memory 132 or the non-volatile memory 134.

The program 140 may be stored in the memory 130 as software, and may include, for example, an operating system (OS) 142, middleware 144, or an application 146.

The input module 150 may receive a command or data to be used by another component (e.g., the processor 120) of the electronic device 101, from the outside (e.g., a user) of the electronic device 101. The input module 150 may include, for example, a microphone, a mouse, a keyboard, a key (e.g., a button), or a digital pen (e.g., a stylus pen).

The sound output module 155 may output sound signals to the outside of the electronic device 101. The sound output module 155 may include, for example, a speaker or a receiver. The speaker may be used for general purposes, such as playing multimedia or playing record. The receiver may be used for receiving incoming calls. According to an embodiment, the receiver may be implemented as separate from, or as part of the speaker.

The display module 160 may visually provide information to the outside (e.g., a user) of the electronic device 101. The display module 160 may include, for example, a display, a hologram device, or a projector and control circuitry to control a corresponding one of the display, hologram device, and projector. According to an embodiment, the display module 160 may include a touch sensor adapted to detect a touch, or a pressure sensor adapted to measure the intensity of force incurred by the touch.

The audio module 170 may convert a sound into an electrical signal and vice versa. According to an embodiment, the audio module 170 may obtain the sound via the input module 150, or output the sound via the sound output module 155 or a headphone of an external electronic device (e.g., an electronic device 102) directly (e.g., wiredly) or wirelessly coupled with the electronic device 101.

The sensor module 176 may detect an operational state (e.g., power or temperature) of the electronic device 101 or an environmental state (e.g., a state of a user) external to the electronic device 101, and then generate an electrical signal or data value corresponding to the detected state. According to an embodiment, the sensor module 176 may include, for example, a gesture sensor, a gyro sensor, an atmospheric pressure sensor, a magnetic sensor, an acceleration sensor, a grip sensor, a proximity sensor, a color sensor, an infrared (IR) sensor, a biometric sensor, a temperature sensor, a humidity sensor, or an illuminance sensor.

The interface 177 may support one or more specified protocols to be used for the electronic device 101 to be coupled with the external electronic device (e.g., the electronic device 102) directly (e.g., wiredly) or wirelessly. According to an embodiment, the interface 177 may include, for example, a high definition multimedia interface (HDMI), a universal serial bus (USB) interface, a secure digital (SD) card interface, or an audio interface.

A connecting terminal 178 may include a connector via which the electronic device 101 may be physically connected with the external electronic device (e.g., the electronic device 102). According to an embodiment, the connecting terminal 178 may include, for example, a HDMI connector, a USB connector, a SD card connector, or an audio connector (e.g., a headphone connector).

The haptic module 179 may convert an electrical signal into a mechanical stimulus (e.g., a vibration or a movement) or electrical stimulus which may be recognized by a user via his tactile sensation or kinesthetic sensation. According to an embodiment, the haptic module 179 may include, for example, a motor, a piezoelectric element, or an electric stimulator.

The camera module 180 may capture a still image or moving images. According to an embodiment, the camera module 180 may include one or more lenses, image sensors, image signal processors, or flashes.

The power management module 188 may manage power supplied to the electronic device 101. According to an embodiment, the power management module 188 may be implemented as at least part of, for example, a power management integrated circuit (PMIC).

The battery 189 may supply power to at least one component of the electronic device 101. According to an embodiment, the battery 189 may include, for example, a primary cell which is not rechargeable, a secondary cell which is rechargeable, or a fuel cell.

The communication module 190 may support establishing a direct (e.g., wired) communication channel or a wireless communication channel between the electronic device 101 and the external electronic device (e.g., the electronic device 102, the electronic device 104, or the server 108) and performing communication via the established communication channel. The communication module 190 may include one or more communication processors that are operable independently from the processor 120 (e.g., the application processor (AP)) and supports a direct (e.g., wired) communication or a wireless communication. According to an embodiment, the communication module 190 may include a wireless communication module 192 (e.g., a cellular communication module, a short-range wireless communication module, or a global navigation satellite system (GNSS) communication module) or a wired communication module 194 (e.g., a local area network (LAN) communication module or a power line communication (PLC) module). A corresponding one of these communication modules may communicate with the external electronic device via the first network 198 (e.g., a short-range communication network, such as Bluetooth™, wireless-fidelity (Wi-Fi) direct, or infrared data association (IrDA)) or the second network 199 (e.g., a long-range communication network, such as a legacy cellular network, a 5G network, a next-generation communication network, the Internet, or a computer network (e.g., LAN or wide area network (WAN)). These various types of communication modules may be implemented as a single component (e.g., a single chip), or may be implemented as multi components (e.g., multi chips) separate from each other. The wireless communication module 192 may identify and authenticate the electronic device 101 in a communication network, such as the first network 198 or the second network 199, using subscriber information (e.g., international mobile subscriber identity (IMSI)) stored in the subscriber identification module 196.

The wireless communication module 192 may support a 5G network, after a 4G network, and next-generation communication technology, e.g., new radio (NR) access technology. The NR access technology may support enhanced mobile broadband (eMBB), massive machine type communications (mMTC), or ultra-reliable and low-latency communications (URLLC). The wireless communication module 192 may support a high-frequency band (e.g., the mmWave band) to achieve, e.g., a high data transmission rate. The wireless communication module 192 may support various technologies for securing performance on a high-frequency band, such as, e.g., beamforming, massive multiple-input and multiple-output (massive MIMO), full dimensional MIMO (FD-MIMO), array antenna, analog beam-forming, or large scale antenna. The wireless communication module 192 may support various requirements specified in the electronic device 101, an external electronic device (e.g., the electronic device 104), or a network system (e.g., the second network 199). According to an embodiment, the wireless communication module 192 may support a peak data rate (e.g., 20 Gbps or more) for implementing eMBB, loss coverage (e.g., 164 dB or less) for implementing mMTC, or U-plane latency (e.g., 0.5 ms or less for each of downlink (DL) and uplink (UL), or a round trip of 1 ms or less) for implementing URLLC.

The antenna module 197 may transmit or receive a signal or power to or from the outside (e.g., the external electronic device) of the electronic device 101. According to an embodiment, the antenna module 197 may include an antenna including a radiating element including a conductive material or a conductive pattern formed in or on a substrate (e.g., a printed circuit board (PCB)). According to an embodiment, the antenna module 197 may include a plurality of antennas (e.g., array antennas). In such a case, at least one antenna appropriate for a communication scheme used in the communication network, such as the first network 198 or the second network 199, may be selected, for example, by the communication module 190 (e.g., the wireless communication module 192) from the plurality of antennas. The signal or the power may then be transmitted or received between the communication module 190 and the external electronic device via the selected at least one antenna. According to an embodiment, another component (e.g., a radio frequency integrated circuit (RFIC)) other than the radiating element may be additionally formed as part of the antenna module 197.

According to various embodiments, the antenna module 197 may form a mmWave antenna module. According to an embodiment, the mmWave antenna module may include a printed circuit board, a RFIC disposed on a first surface (e.g., the bottom surface) of the printed circuit board, or adjacent to the first surface and capable of supporting a designated high-frequency band (e.g., the mmWave band), and a plurality of antennas (e.g., array antennas) disposed on a second surface (e.g., the top or a side surface) of the printed circuit board, or adjacent to the second surface and capable of transmitting or receiving signals of the designated high-frequency band.

At least some of the above-described components may be coupled mutually and communicate signals (e.g., commands or data) therebetween via an inter-peripheral communication scheme (e.g., a bus, general purpose input and output (GPIO), serial peripheral interface (SPI), or mobile industry processor interface (MIPI)).

According to an embodiment, commands or data may be transmitted or received between the electronic device 101 and the external electronic device 104 via the server 108 coupled with the second network 199. Each of the electronic devices 102 or 104 may be a device of a same type as, or a different type, from the electronic device 101. According to an embodiment, all or some of operations to be executed at the electronic device 101 may be executed at one or more of the external electronic devices 102, 104, or 108. For example, if the electronic device 101 should perform a function or a service automatically, or in response to a request from a user or another device, the electronic device 101, instead of, or in addition to, executing the function or the service, may request the one or more external electronic devices to perform at least part of the function or the service. The one or more external electronic devices receiving the request may perform the at least part of the function or the service requested, or an additional function or an additional service related to the request, and transfer an outcome of the performing to the electronic device 101. The electronic device 101 may provide the outcome, with or without further processing of the outcome, as at least part of a reply to the request. To that end, a cloud computing, distributed computing, mobile edge computing (MEC), or client-server computing technology may be used, for example. The electronic device 101 may provide ultra low-latency services using, e.g., distributed computing or mobile edge computing. In an embodiment, the external electronic device 104 may include an internet-of-things (IoT) device. The server 108 may be an intelligent server using machine learning and/or a neural network. According to an embodiment, the external electronic device 104 or the server 108 may be included in the second network 199. The electronic device 101 may be applied to intelligent services (e.g., smart home, smart city, smart car, or healthcare) based on 5G communication technology or IoT-related technology.

Figure 2:
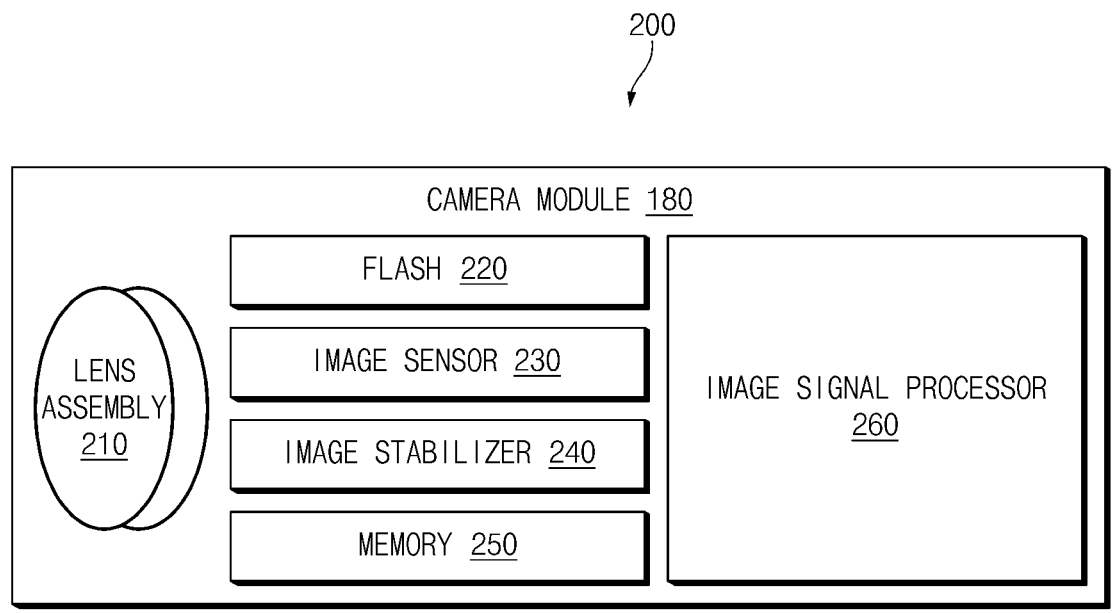
FIG. 2 is a block diagram illustrating an example configuration of a camera module according to various embodiments.

FIG. 2 is a block diagram 200 illustrating an example configuration of the camera module 180 according to various embodiments.

Referring to FIG. 2, the camera module 180 may include a lens assembly 210, a flash 220, an image sensor 230, an image stabilizer 240, memory 250 (e.g., buffer memory), and/or an image signal processor (e.g., including image processing circuitry) 260. The lens assembly 210 may collect light emitted or reflected from an object whose image is to be taken. The lens assembly 210 may include one or more lenses. According to an embodiment, the camera module 180 may include a plurality of lens assemblies 210. In such a case, the camera module 180 may form, for example, a dual camera, a 360-degree camera, or a spherical camera. Some of the plurality of lens assemblies 210 may have the same lens attribute (e.g., view angle, focal length, auto-focusing, f number, or optical zoom), or at least one lens assembly may have one or more lens attributes different from those of another lens assembly. The lens assembly 210 may include, for example, a wide-angle lens or a telephoto lens.

The flash 220 may emit light that is used to reinforce light reflected from an object. According to an embodiment, the flash 220 may include one or more light emitting diodes (LEDs) (e.g., a red-green-blue (RGB) LED, a white LED, an infrared (IR) LED, or an ultraviolet (UV) LED) or a xenon lamp. The image sensor 230 may obtain an image corresponding to an object by converting light emitted or reflected from the object and transmitted via the lens assembly 210 into an electrical signal. According to an embodiment, the image sensor 230 may include one selected from image sensors having different attributes, such as a RGB sensor, a black-and-white (BW) sensor, an IR sensor, or a UV sensor, a plurality of image sensors having the same attribute, or a plurality of image sensors having different attributes. Each image sensor included in the image sensor 230 may be implemented using, for example, a charged coupled device (CCD) sensor or a complementary metal oxide semiconductor (CMOS) sensor.

The image stabilizer 240 may move the image sensor 230 or at least one lens included in the lens assembly 210 in a particular direction, or control an operational attribute (e.g., adjust the read-out timing) of the image sensor 230 in response to the movement of the camera module 180 or the electronic device 101 including the camera module 180. This allows compensating for at least part of a negative effect (e.g., image blurring) by the movement on an image being captured. According to an embodiment, the image stabilizer 240 may sense such a movement by the camera module 180 or the electronic device 101 using a gyro sensor (not shown) or an acceleration sensor (not shown) disposed inside or outside the camera module 180. According to an embodiment, the image stabilizer 240 may be implemented, for example, as an optical image stabilizer. The memory 250 may store, at least temporarily, at least part of an image obtained via the image sensor 230 for a subsequent image processing task. For example, if image capturing is delayed due to shutter lag or multiple images are quickly captured, a raw image obtained (e.g., a Bayer-patterned image, a high-resolution image) may be stored in the memory 250, and its corresponding copy image (e.g., a low-resolution image) may be previewed via the display module 160. Thereafter, if a specified condition is met (e.g., by a user's input or system command), at least part of the raw image stored in the memory 250 may be obtained and processed, for example, by the image signal processor 260. According to an embodiment, the memory 250 may be configured as at least part of the memory 130 or as a separate memory that is operated independently from the memory 130.

The image signal processor 260 may include various image processing circuitry and perform one or more image processing with respect to an image obtained via the image sensor 230 or an image stored in the memory 250. The one or more image processing may include, for example, depth map generation, three-dimensional (3D) modeling, panorama generation, feature point extraction, image synthesizing, or image compensation (e.g., noise reduction, resolution adjustment, brightness adjustment, blurring, sharpening, or softening). Additionally or alternatively, the image signal processor 260 may perform control (e.g., exposure time control or read-out timing control) with respect to at least one (e.g., the image sensor 230) of the components included in the camera module 180. An image processed by the image signal processor 260 may be stored back in the memory 250 for further processing, or may be provided to an external component (e.g., the memory 130, the display module 160, the electronic device 102, the electronic device 104, or the server 108) outside the camera module 180. According to an embodiment, the image signal processor 260 may be configured as at least part of the processor 120, or as a separate processor that is operated independently from the processor 120. If the image signal processor 260 is configured as a separate processor from the processor 120, at least one image processed by the image signal processor 260 may be displayed, by the processor 120, via the display module 160 as it is or after being further processed.

According to an embodiment, the electronic device 101 may include a plurality of camera modules 180 having different attributes or functions. In such a case, at least one of the plurality of camera modules 180 may form, for example, a wide-angle camera and at least another of the plurality of camera modules 180 may form a telephoto camera. Similarly, at least one of the plurality of camera modules 180 may form, for example, a front camera and at least another of the plurality of camera modules 180 may form a rear camera.

Figure 3:
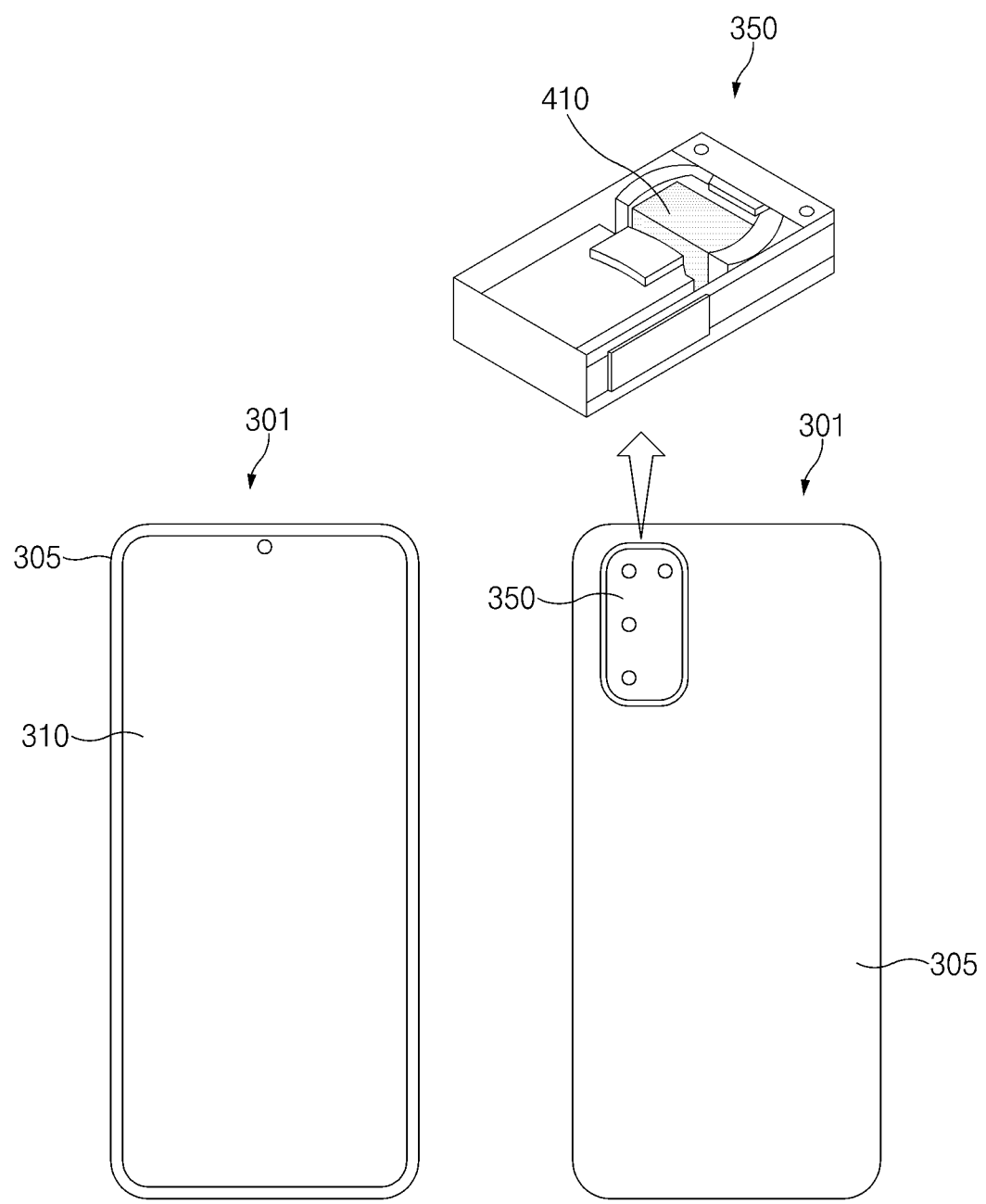
FIG. 3 is a diagram illustrating an electronic device including a camera module according to various embodiments.

FIG. 3 is a diagram including a perspective view illustrating an electronic device including a camera module according to various embodiments. Hereinafter, a case in which the camera module is a folded (e.g., foldable) camera module and a prism is moved or rotated to scan an object will be mainly discussed, but the present disclosure is not limited thereto. For example, the camera module may have a structure in which all or part of an optical system may rotate in a plurality of directions (e.g., a yaw direction or a pitch direction). As used herein, the terms "folded" and "foldable" when referencing the camera or camera module, may be used interchangeably, and the camera module is not limited to only being in a folded configuration.

Referring to FIG. 3, the electronic device 301 may include a main body (or housing) 305, a display 310 (e.g., the display module 160 of FIG. 1), and a foldable camera module 350 (e.g., the camera module 180 of FIG. 1 or 2).

On the main body (or housing) 305, the display 310 and the foldable camera module 350 may be mounted. The main body 305 may include various components for driving the electronic device 301 therein, such as, a processor (e.g., the processor 120 of FIG. 1), a memory (e.g., the memory 130 of FIG. 1), a communication circuit (e.g., the communication module 190 of FIG. 1), a printed circuit board, or a battery (e.g., the battery 189 of FIG. 1).

The display 310 may display various contents such as text or images through a first surface (e.g., a front surface) of the main body 305. The display 310 may include a plurality of layers. For example, the display 310 may include a glass panel, a touch panel, or a display panel.

At least a portion of the folded (e.g., foldable) camera module (or folded or foldable camera structure) 350 may be exposed toward a second surface (e.g., a back surface, which is a surface on which the display 310 does not output contents) of the main body 305. For example, a lens unit (e.g., including a lens), a flash unit (e.g., including a flash, and/or a sensor unit (e.g., including a sensor) of the folded/foldable camera module 350 may be exposed to the outside of the main body 305.

According to various embodiments, the folded/foldable camera module 350 may include a prism (or reflective mirror) 410 therein. The prism 410 may change a path of light introduced into the folded/foldable camera 250 through the lens unit of the folded/foldable camera module 350. Light reflected through the prism 410 may be introduced into an image sensor of the folded/foldable camera module 350.

According to various embodiments, the prism 410 may rotate (or move) in a plurality of directions. For example, the prism 410 may rotate within a specified range in a yaw direction or a pitch direction. A scan function (e.g., object detection or object tracking) of the folded/foldable camera module 350 may be performed according to rotation (or movement) of the prism 410.

According to various embodiments, a processor (e.g., the processor 120 of FIG. 1) or an image signal processor (e.g., the image signal processor 260 of FIG. 2) inside the electronic device 301 may include various processing circuitry and correct a region of interest (ROI) for performing the scan function by reflecting the amount of rotation (or the amount of movement) of the prism 410 (see FIGS. 4a to 9).

Figure 4A:
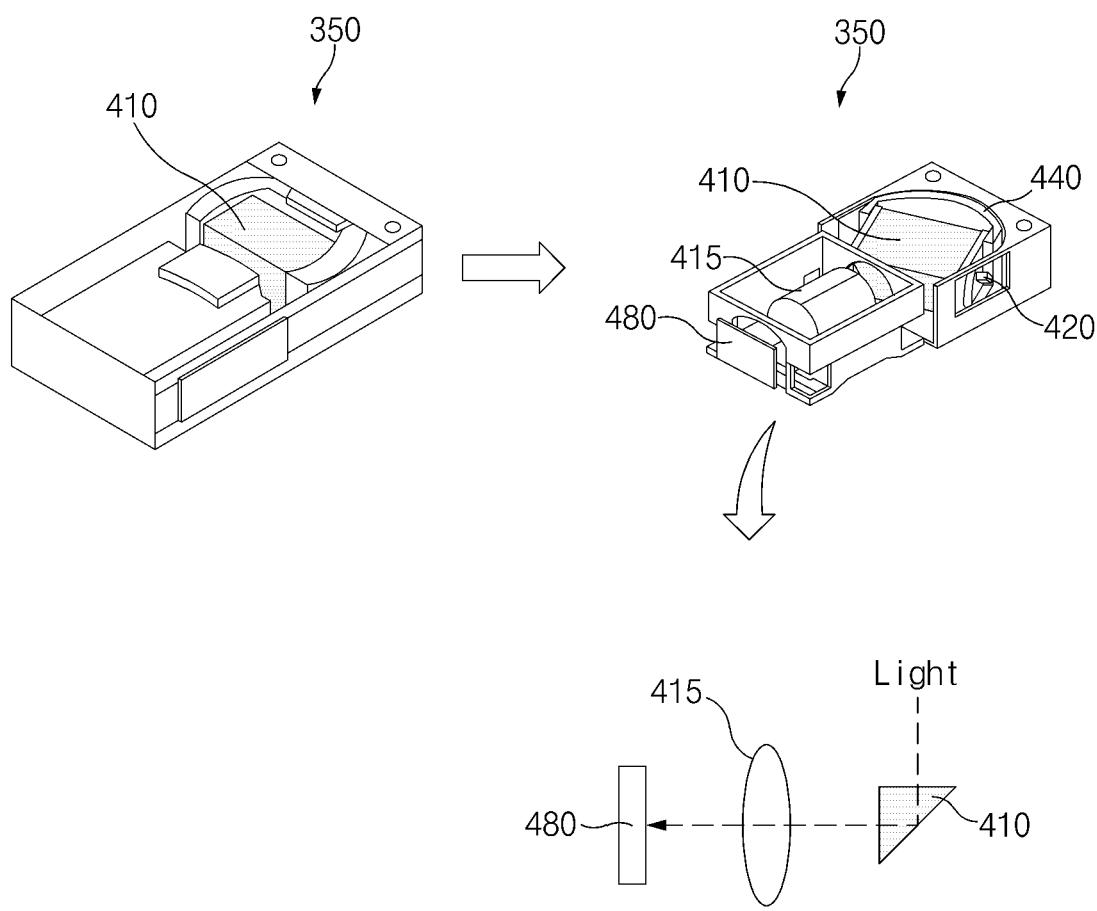
FIGS. 4A and 4B are diagrams including perspective views illustrating an example structure of a foldable camera module according to various embodiments.
Figure 4B:
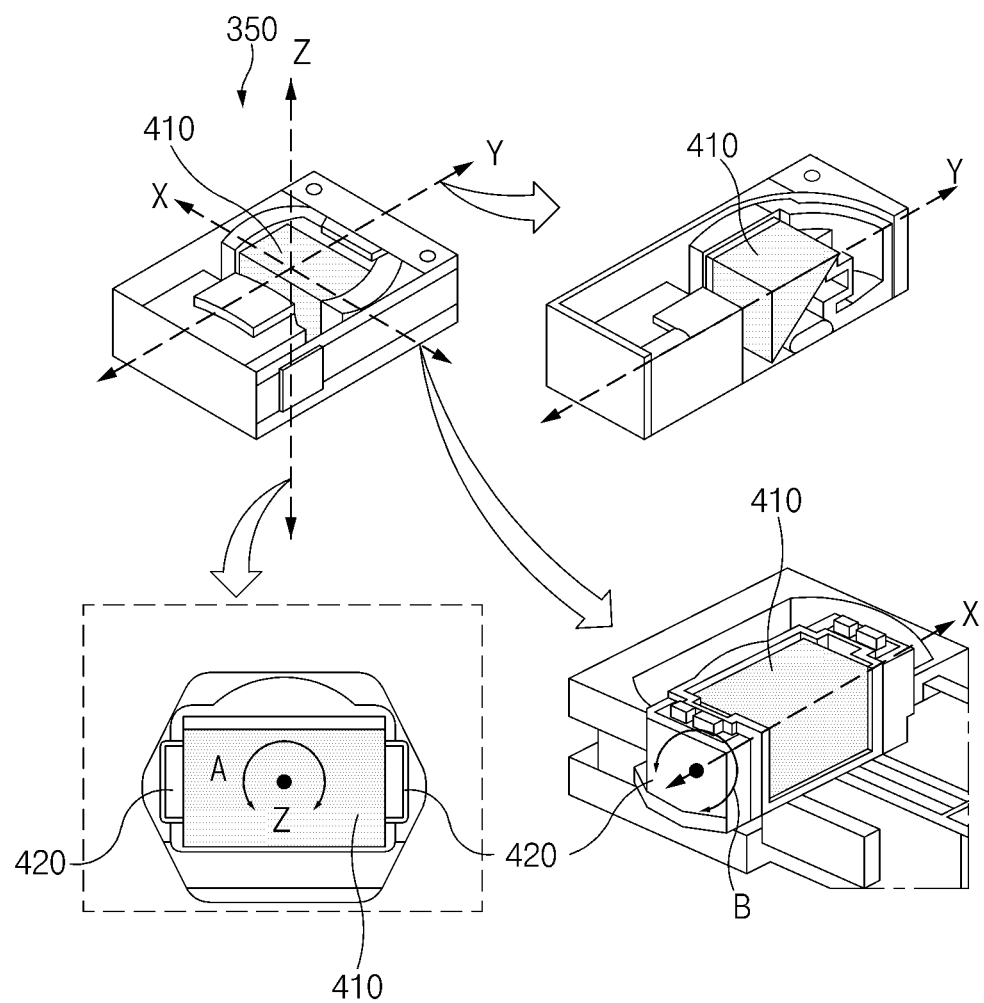

FIGS. 4A and 4B are diagrams including perspective views illustrating an example structure of a folded/foldable camera module according to various embodiments.

Referring to FIG. 4A, the folded/foldable camera module 350 may include a prism 410, a lens unit (e.g., including a lens) 415, a driving unit (e.g., including a coil) 420, a magnetic body 440, and an image sensor 480.

The prism 410 may operate as a reflective mirror that changes the path of light introduced into the folded camera module 350. Light reflected through the prism 410 may be introduced into the image sensor 480 through the lens unit 405.

The lens unit 415 may include at least one lens and transmit the light reflected by the prism 410 to the image sensor 480. The lens unit 415 may change the path of light through refraction.

The driving unit 420 may include a coil and rotate the prism 410 in a first direction (e.g., the yaw direction) or a second direction (e.g., the pitch direction). The driving unit 420 may operate according to a control signal of the processor (e.g., the processor 120 of FIG. 1) or an image signal processor (e.g., the image signal processor 260 of FIG. 2) included in the folded/foldable camera module 350. According to various embodiments, the driving unit 420 may include a first coil for rotation in the first direction and a second coil for rotation in the second direction, and may include a component such as a spring (see FIGS. 5 and 6).

The magnetic body 440 may move along with the rotation of the prism 410. As the magnetic body 440 moves, magnetic flux around the prism 410 may change.

The image sensor 480 may convert light acquired through the prism 410 and the lens unit 415 into an electronic image signal through a photoelectric conversion effect. The image sensor 230 may include a group of two-dimensionally arranged pixels, and convert light from each pixel into electronic image data. The image sensor 230 may read out electronic image data according to the photoelectric conversion effect recorded in each pixel.

Referring to FIG. 4B, the prism 410 may rotate (or move) in a plurality of directions. For example, the prism 410 may rotate within a first angle range (e.g., +21 degrees to −21 degrees) specified in the yaw direction (A direction, a direction rotating around a Z axis). In addition, the prism 410 may rotate within a second angle range (e.g., +9 degrees to −9 degrees) specified in the pitch direction (B direction, a direction rotating around an X axis).

According to various embodiments, when the folded/foldable camera module 350 performs the scan function, the prism 410 may rotate in the first direction A (e.g., the yaw direction) or the second direction B (e.g., the pitch direction). When the prism 410 rotates (or moves), an image acquired through the folded/foldable camera module 350 may be deformed or rotated. In this case, the shape of a subject on the image may be deformed or rotated, and an error may occur in the specified function (e.g., 3A, setting related to FD based photographing). The processor (e.g., the processor 120 of FIG. 1) or the image signal processor (e.g., the image signal processor 260 of FIG. 2) may correct the region of interest by reflecting the amount of rotation (or the amount of movement) of the prism 410 to improve the performance of the specified function (e.g., 3A, FD) (see FIGS. 5 to 12).

Figure 5:
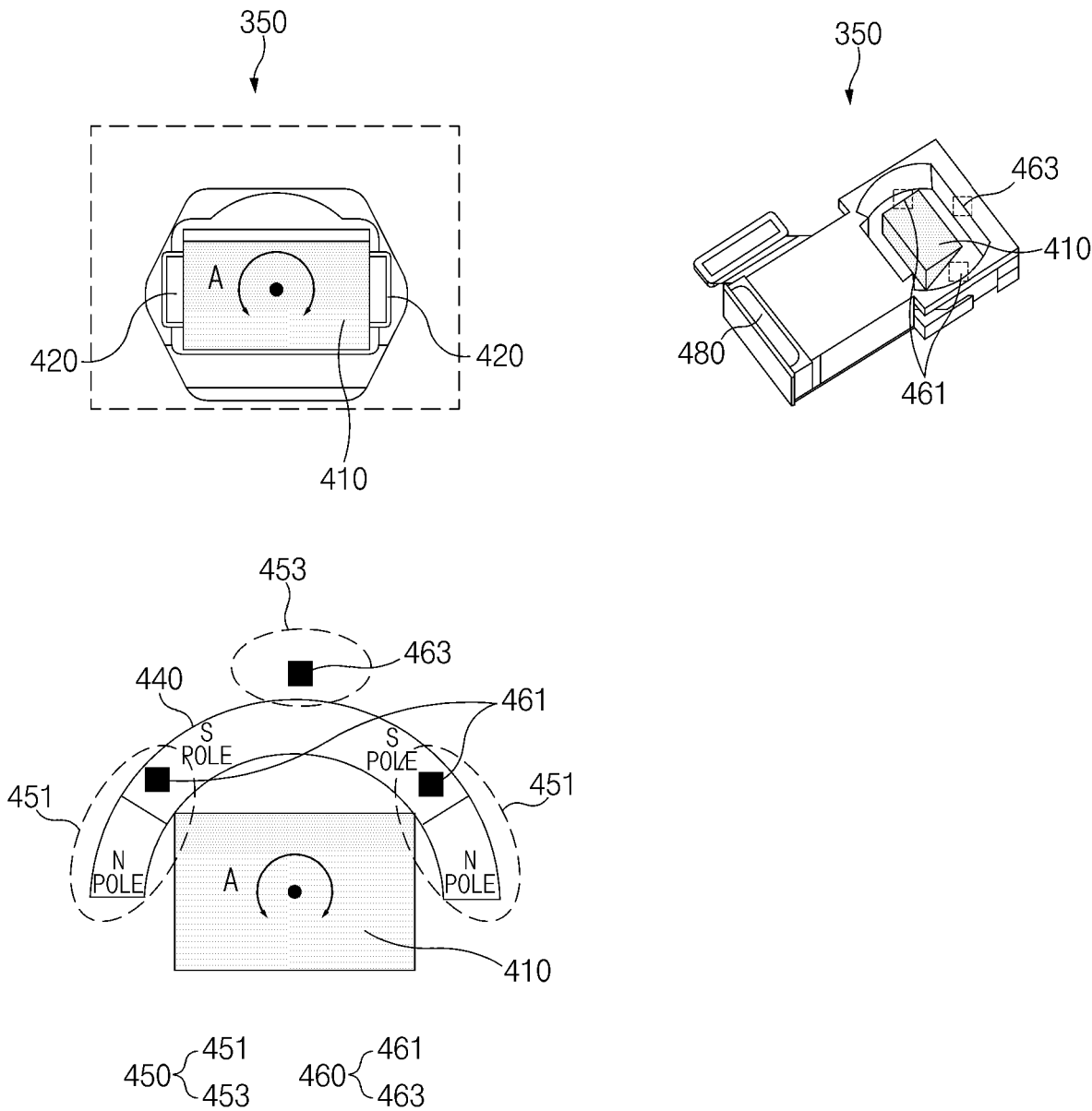
FIG. 5 is a diagram including a perspective view illustrating an example configuration for detecting the amount of rotation of a prism in a first direction according to various embodiments.
Figure 6:
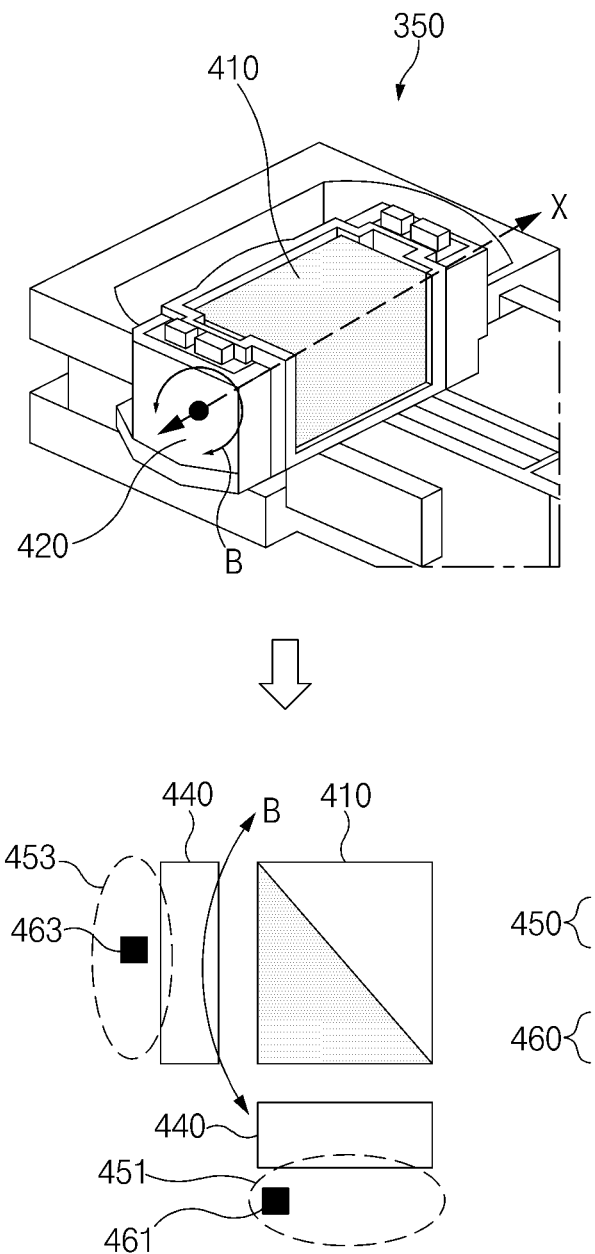
FIG. 6 is a diagram including a perspective view illustrating an example configuration for detecting the amount of rotation of the prism in a second direction according to various embodiments.

Although not illustrated in FIGS. 4a and 4B, the folded/foldable camera module 350 may further include a sensor unit for detecting the amount of rotation of the prism 410 in the first direction or the second direction (see FIGS. 5 and 6).

FIG. 5 is a diagram including perspective views illustrating rotation of the prism in the first direction according to various embodiments. FIG. 6 is a diagram including perspective views illustrating rotation of the prism in the second direction according to various embodiments.

Referring to FIGS. 5 and 6, the prism 410 may rotate within the first angle range (e.g., +21 degrees to −21 degrees) specified in the first direction A (e.g., the yaw direction) by the driving unit 420. In addition, the prism 410 may rotate within the second angle range (e.g., +9 degrees to −9 degrees) specified in the second direction B (e.g., the pitch direction) by the driving unit 420.

According to an embodiment, a plurality of driving units 420 may be provided. The plurality of driving units 420 may be disposed in different directions. For example, the driving unit 420 may include a coil unit (or a plurality of coils) 450. A first coil and a second coil 451 of the coil unit 450 may rotate the magnetic body 440 and the prism 410 in the first direction by electromagnetic force. A third coil 453 of the coil unit 450 may rotate the magnetic body 440 and the prism 410 in the second direction by the electromagnetic force.

According to various embodiments, the folded/foldable camera module 350 may include the magnetic body 440 and the coil unit 450 for rotating (or moving) the prism 410, and a sensor unit 460 for detecting rotation (or movement) of the prism 410. The coil unit 450 may be a part of the driving unit 420 of FIG. 4a.

The magnetic body 440 may move along with the rotation of the prism 410. As the magnetic body 440 rotates in the first direction A (e.g., the yaw direction) or the second direction B (e.g., the pitch direction), the amount of magnetic flux introduced into the sensor unit 460 may be changed. A sensing value detected by the sensor unit 460 may be changed according to the changed amount of magnetic flux.

The coil unit 450 may be disposed to surround at least a portion of the sensor unit 460. The coil unit 450 may be disposed on the same plane as the sensor unit 460. The coil unit 450 may move the magnetic body 440 by electromagnetic force, and the prism 410 may move along with the movement of the magnetic body 440. For example, the coil unit 450 may include the first coil and a second coil 451 surrounding a first Hall sensor and a second Hall sensor 461, and the third coil 453 surrounding a third Hall sensor 463.

The sensor unit 460 may detect the amount of rotation of the prism 410. As the prism 410 rotates, the magnetic body 440 may also rotate, and accordingly, the amount of magnetic flux introduced into the sensor unit 460 may be changed. The sensor unit 460 may obtain a sensing value by detecting the amount of magnetic flux. For example, the sensor unit 460 may include the first Hall sensor and the second Hall sensor 461 that detect a first amount of rotation in the first direction A. The sensor unit 460 may include the third Hall sensor 463 that detects a second amount of rotation in the second direction B.

According to various embodiments, the processor (e.g., the processor 120 of FIG. 1) or the image signal processor (e.g., the image signal processor 260) may determine the first amount of rotation in the first direction A based on sensing values of the first Hall sensor and the second Hall sensor 461 (hereinafter referred to as first sensing values). The processor 120 or the image signal processor 260 may rotate the region of interest in a direction that offsets the first amount of rotation.

According to various embodiments, the processor 120 or the image signal processor 260 may determine the second amount of rotation in the second direction B based on a sensing value (hereinafter referred to as a second sensing value) of the third Hall sensor 463. The processor 120 or the image signal processor 260 may change a length or ratio of a side of the region of interest by reflecting the second amount of rotation.

FIGS. 5 and 6 are merely examples, and the disclosure is not limited thereto. The number, positions, or connecting method of the magnetic body 440, the coil unit 450, and the sensor unit 460 may be changed.

FIG. 7 is a table in which rotation angles of the prism are matched with sensing values of the sensor unit according to various embodiments. FIG. 7 is simply an example and the disclosure is not limited thereto.

Referring to FIG. 7, the memory (e.g., the memory 130 of FIG. 1) may store a table 701 in which sensing values of the sensor unit 460 and the first amount of rotation and the second amount of rotation of the prism 410 are matched. In the table 701, first sensing values of the sensor unit 460 corresponding to a rotatable range of the prism 410 in the first direction and second sensing values thereof corresponding to a rotation angle range in the second direction may be matched.

The processor (e.g., the processor 120 of FIG. 1) or the image signal processor (e.g., the image signal processor 260 of FIG. 2) may acquire the first sensing values and the second sensing values using the sensor unit 460. The processor 120 or the image signal processor 260 may determine the first amounts of rotation and the second amounts of rotation corresponding to the first sensing values and the second sensing values by referring to the pre-stored table 701.

For example, when a sensing value of the first Hall sensor or the second Hall sensor 461 is 50 and a sensing value of the third Hall sensor 463 is 50, the processor 120 or the image signal processor 260 may determine that the first amount of rotation is 17.8 degrees and the second amount of rotation is 5.9 degrees by referring to the table 701.

According to various embodiments, the processor 120 or the image signal processor 260 may determine the second amounts of rotation based on the second sensing values. The second amount of rotation may not be affected by the first sensing value. On the other hand, the processor 120 or the image signal processor 260 may determine the first amounts of rotation based on the first sensing values and the second sensing values.

For example, if the second sensing value is 50, the processor 120 or the image signal processor 260 may determine that the second amount of rotation is 5.9 degrees by referring to the table 701. The second amount of rotation may not be affected by the first sensing value. On the other hand, the processor 120 or the image signal processor 260 may determine, by referring to the table 701, that, when the first sensing value is 50 and the second sensing value is 50, the first amount of rotation is 17.8 degrees, and determine that, when the first sensing value is 50 and the second sensing value is 1850, the first amount of rotation is 15.8 degrees.

Matching values of the table 701 of FIG. 7 may vary depending on the characteristics of the Hall sensors 461 and 463 and the disposition of the magnetic body 440 and the coil unit 450.

Figure 8:
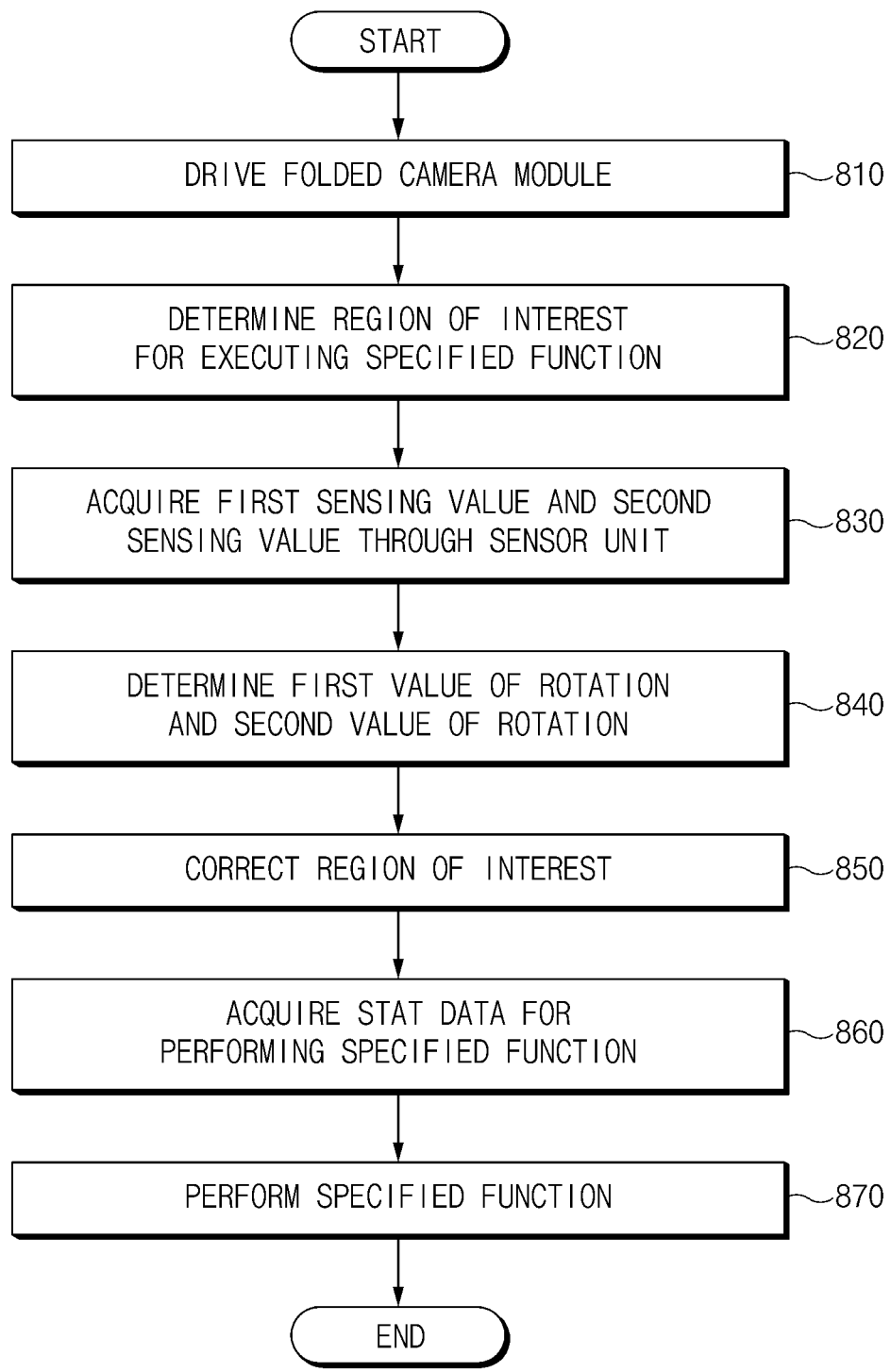
FIG. 8 is a flowchart illustrating an example image processing method according to various embodiments.

FIG. 8 is a flowchart illustrating an example image processing method according to various embodiments.

Referring to FIG. 8, in operation 810, the processor 120 may drive the folded/foldable camera module 350. The processor 120 may acquire image data using light introduced into the image sensor 480 through the prism 410 and the lens unit 415.

According to various embodiments, the processor 120 may display a preview image on the display 310 using image data acquired by the image sensor 480. For example, the processor 120 may display a preview image by one of a camera app and a face detection app on the display 310.

In operation 820, the processor 120 may determine a region of interest for executing a specified function. For example, the processor 120 may determine a rectangular region of interest having a specified size from a center point of a detected face and display the determined region of interest on the display 310 in order to perform settings (e.g., exposure setting or WB) related to 3A (AE, AF, AWB) or face detection (FD)-based photographing. For another example, for 3A (AE, AF, AWB), the processor 120 may determine that the detected face region is the region of interest, or may set a region selected by a user input or a region determined according to a photographing mode as the region of interest.

In operation 830, the processor 120 may acquire a first sensing value and a second sensing value through the sensor unit 460. The first sensing value may be a value mainly related to the rotation of the prism 410 in the first direction (e.g., yaw). The second sensing value may be a value mainly related to the rotation of the prism 410 in the second direction (e.g., pitch). For example, the first sensing value by the first Hall sensor or the second Hall sensor (e.g., the first Hall sensor or the second Hall sensor 461 of FIG. 5) and the second sensing value by the third Hall sensor (e.g., the third Hall sensor 463 of FIG. 5) may be acquired.

In operation 840, the processor 120 may determine a first amount of rotation and a second amount of rotation based on the first sensing value and the second sensing value. The processor 120 may determine the first amount of rotation and the second amount of rotation by referring to a table previously stored in the memory 130 (e.g., the table 701 of FIG. 7).

For example, the processor 120 may determine the first amount of rotation that matches the first sensing value. The first amount of rotation may be a rotation angle of the prism 410 in the first direction (e.g., yaw). The processor 120 may determine the second amount of rotation that matches the second sensing value. The second amount of rotation may be a rotation angle of the prism 410 in the second direction (e.g., pitch).

In operation 850, the processor 120 may correct the region of interest based on the first amount of rotation and the second amount of rotation. For example, when the first amount of rotation is equal to or greater than a first reference value, the processor 120 may rotate the region of interest in a direction that offsets the first amount of rotation. When the second amount of rotation is equal to or greater than a second reference value, the processor 120 may adjust a length or ratio of a side of the region of interest.

Figure 10:
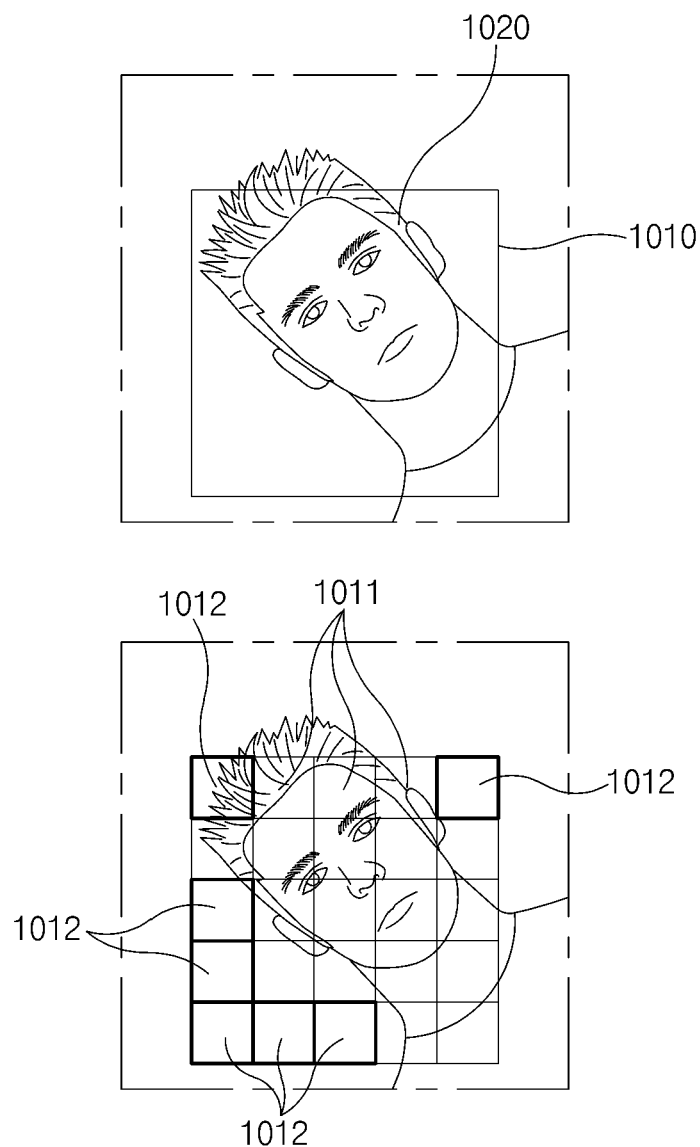
FIG. 10 is a diagram illustrating an example of acquiring stat data by dividing a region of interest into a plurality of sections according to various embodiments.
Figure 11:
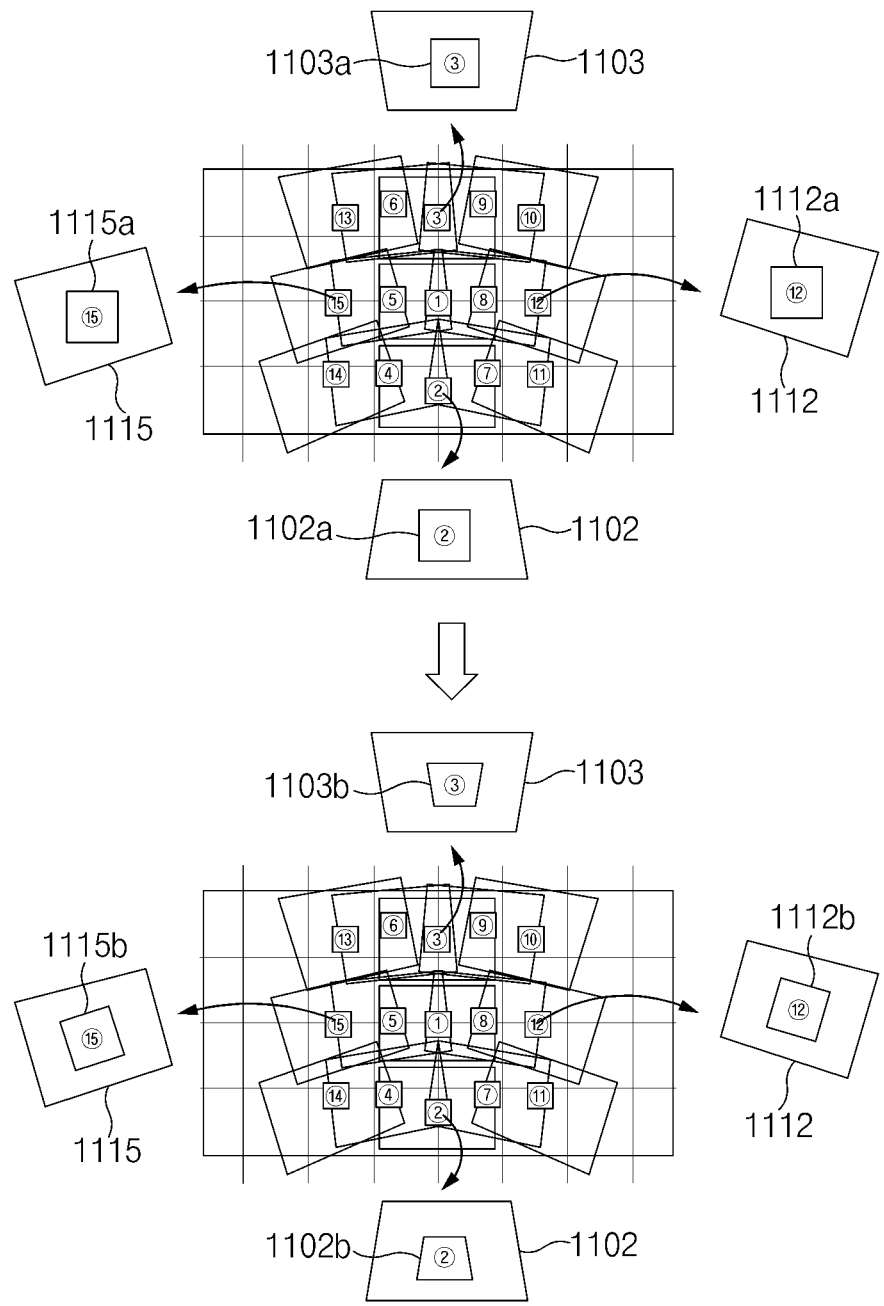
FIGS. 11 and 12 are diagrams illustrating correction of a region of interest according to various embodiments.
Figure 12:
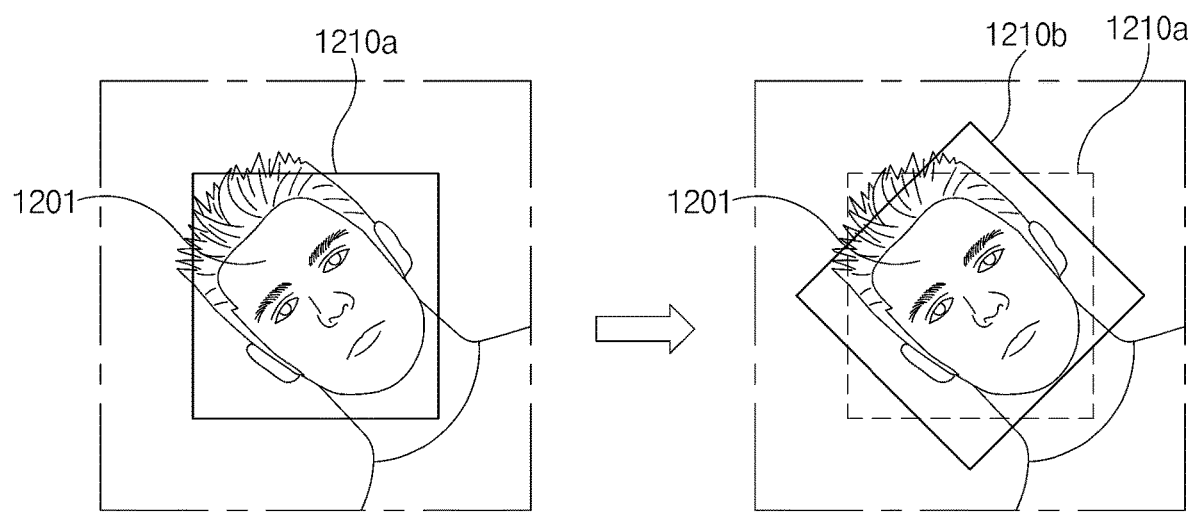

For example, the processor 120 may rotate coordinates of the region of interest, adjust the position, or change the size (see FIGS. 11 and 12). For another example, the processor 120 may divide the region of interest into a plurality of sections and determine that sections overlapping a subject (in a distorted or rotated state) at a predetermined ratio or more are new regions of interest (see FIG. 10).

In operation 860, the processor 120 may acquire data for performing a specified function (hereinafter referred to as stat data) from image data for the corrected region of interest. For example, the processor 120 may acquire stat data for performing 3A (AE, AF, AWB) in a camera app. For another example, the processor 120 may acquire stat data for exposure setting or WB based on face detection.

In operation 870, the processor 120 may perform the specified function using the acquired stat data. The processor 120 may perform 3A (AE, AF, AWB) or perform exposure setting or WB based on face detection in the camera app.

When 3A (AE, AF, AWB) or exposure setting or WB based on face detection (FD) is performed through an uncorrected region of interest, data for an unnecessary background region is processed together with data for an object region, and the performance (or reliability) of a 3A (AE, AF, AWB) or face detection (FD)-based function may be lowered. On the other hand, when the 3A (AE, AF, AWB) or face detection (FD) function is performed by reflecting the amount of rotation of the prism 410, data for an unnecessary background region is removed, and the performance (or reliability) of the 3A (AE, AF, AWB) or face detection (FD) function may be increased.

According to various embodiments, the processor 120 may perform correction of the region of interest in the background and may not display the correcting through the display 310. For example, the processor 120 may maintain the display of the face region displayed on the display 310 to the same before and after correcting the region of interest. The processor 120 may acquire stat data in the region of interest corrected according to the amount of rotation of the prism 410 through background processing, and may perform image processing related to exposure setting or WB based on face detection.

At least part of the operation of the processor 120 in FIG. 8 may be performed by an image signal processor (e.g., the image signal processor 260 of FIG. 2) included in the folded/foldable camera module 350.

Figure 9:
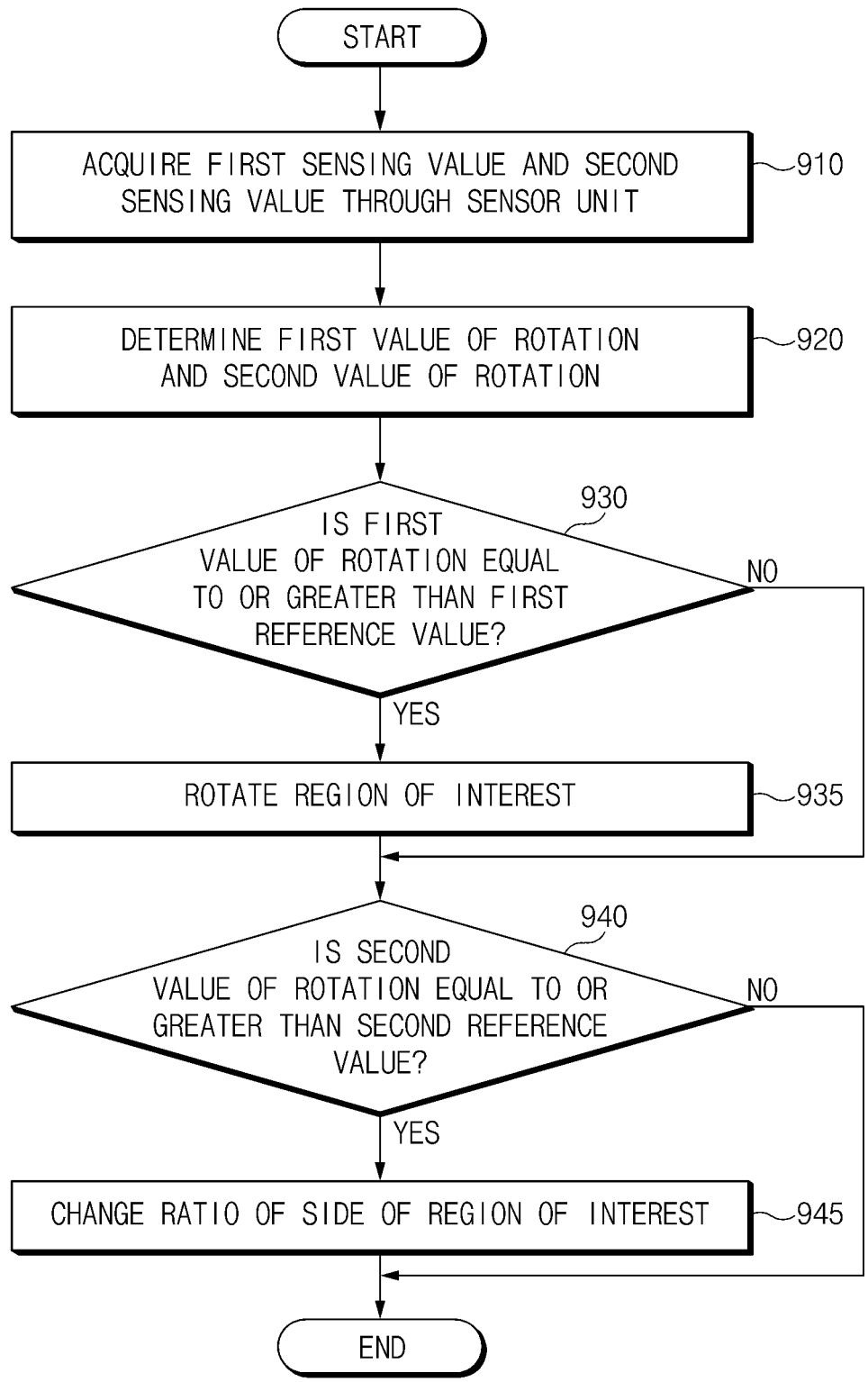
FIG. 9 is a flowchart illustrating an example method of correcting a region of interest according to various embodiments.

FIG. 9 is a flowchart illustrating an example method of correcting a region of interest according to various embodiments.

Referring to FIG. 9, in operation 910, the processor 120 may acquire a first sensing value and a second sensing value through the sensor unit 460. The first sensing value may be a value mainly related to the rotation of the prism 410 in the first direction (e.g., yaw). The second sensing value may be a value mainly related to the rotation of the prism 410 in the second direction (e.g., pitch).

In operation 920, the processor 120 may determine a first amount of rotation and a second amount of rotation based on the first sensing value and the second sensing value. The processor 120 may determine the first amount of rotation and the second amount of rotation by referring to a table previously stored in the memory 130 (e.g., the table 701 of FIG. 7).

In operation 930, the processor 120 may determine whether the first amount of rotation is equal to or greater than (or exceeds) a specified first reference value. For example, the first reference value may be 10 degrees.

In operation 935, when the first amount of rotation is equal to or greater than (or exceeds) the specified first reference value, the processor 120 may rotate the region of interest in a direction (e.g., an opposite direction) that offsets the first amount of rotation.

According to various embodiments, when the first amount of rotation is less than (or less than or equal to) the specified first reference value, the processor 120 may omit operation 935.

In operation 940, the processor 120 may determine whether the second amount of rotation is equal to or greater than (or exceeds) a specified second reference value. For example, the second reference value may be 5 degrees.

In operation 945, when the second amount of rotation is equal to or greater than (or exceeds) the specified second reference value, the processor 120 may change a length or ratio of a side of the region of interest to offset the second amount of rotation.

For example, when an image is transformed into a trapezoidal shape by the second amount of rotation, the processor 120 may correct the region of interest to have a trapezoidal shape by changing the lengths of the sides. The processor 120 may extend the length of a side of the region of interest corresponding to a lengthened side of the image. Alternatively, the processor 120 may reduce the length of a side of the region of interest corresponding to a shortened side of the image. Alternatively, the processor 120 may correct the region of interest to be similar to the shape of the image by changing the lengths of all of two sides of the region of interest.

According to various embodiments, when the second amount of rotation is less than (or less than or equal to) the specified second reference value, the processor 120 may omit operation 945.

According to various embodiments, operations 940 and 945 may be performed before operation 930.

According to various embodiments, operations 930 to 945 may be performed in operation 850 of FIG. 8.

At least part of the operation of the processor 120 in FIG. 9 may be performed by an image signal processor (e.g., the image signal processor 260 of FIG. 2) included in the folded/foldable camera module 350.

FIG. 10 is a diagram illustrating an example of acquiring stat data by dividing a region of interest into a plurality of sections according to various embodiments.

Referring to FIG. 10, a processor (e.g., the processor 120 of FIG. 1) or an image signal processor (e.g., the image signal processor 260 of FIG. 2) may divide a region of interest 1010 into a plurality of sections. The processor 120 or the image signal processor 260 may acquire stat data except for at least some of the plurality of sections according to a first amount of rotation or a second amount of rotation of the prism 410.

For example, the processor 120 or the image signal processor 260 may divide the region of interest 1010 into a first group of sections 1011 overlapping a disposition region of an object 1020 by more than (or exceeding) a specified range and a second group of sections 1012 that does not overlap the disposition region of the object 1020 or overlaps less than (or less than or equal to) a specified region. The processor 120 or the image signal processor 260 may extract stat data from the first group of sections 1011. The processor 120 or the image signal processor 260 may not extract stat data or remove extracted stat data from the second group of sections 1012.

In this way, stat data in an unnecessary background region may be removed, and the performance (or reliability) of 3A (AE, AF, AWB) or exposure settings or WB based on face detection (FD) may be increased.

FIG. 10 is merely an example and the disclosure is not limited thereto. Correction of the region of interest may be applied in a manner such as rotation, position change, or size change of the region of interest.

FIGS. 11 and 12 are diagrams illustrating example correction of a region of interest according to various embodiments. FIGS. 11 and 12 are merely examples and the disclosure is not limited thereto.

Referring to FIG. 11, the processor 120 or the image signal processor 260 may correct a region of interest for performing a specified function (e.g., 3A (AE, AF, AWB) or exposure setting or WB based on face detection (PD)) by reflecting the first amount of rotation or the second amount of rotation of the prism 410.

For example, in a first state ① of the prism 410, the first amount of rotation and the second amount of rotation of the prism 410 may be absent or less than a specified reference value. In this case, the processor 120 may acquire stat data for performing 3A without correcting the region of interest.

For another example, in a second state ② or the third state ③ of the prism 410, the prism 410 may rotate in a second direction (e.g., the pitch direction). In this case, the first amount of rotation of the prism 410 may be zero or less than the specified reference value, and the second amount of rotation of the prism 410 may be equal to or greater than the specified reference value. Images 1102 and 1103 acquired in the second state ② or the third state ③ may be distorted in a trapezoidal or inverted trapezoidal shape. In this case, the shape of object included in the images 1102 and 1103 may also be distorted differently from an actual shape. Unlike the images 1102 and 1103, the regions of interest 1102a and 1103a before correction may have square or rectangular shapes instead of trapezoidal or inverted trapezoidal shapes. When stat data is acquired through the regions of interest 1102a and 1103a before correction, a background other than the object (e.g., a face) is included in the region of interest, and as a consequence, proper exposure may fail or white balance (WB) based on face detection (FD) may become inaccurate. In addition, in the AF process, image blur in which AF is performed occurs in the background.

The processor 120 or the image signal processor 260 may change the rectangular regions of interest 1102a and 1103a before correction into trapezoidal or inverted trapezoidal regions of interest 1102b and 1103b by reflecting the second amount of rotation of the prism 410. The processor 120 or the image signal processor 260 may set the regions of interest 1102b and 1103b by increasing sides of the regions of interest 1102b and 1103b of expanded portions of the images 1102 and 1103 or by reducing sides of the regions of interest 1102b and 1103b of reduced portions of the images 1102 and 1103.

For yet another example, in a twelfth state ⑫ or a fifteenth state ⑮ of the prism 410, the prism 410 may rotate in a first direction (e.g., the yaw direction). The second amount of rotation of the prism 410 may be zero or less than the specified reference value, and the first amount of rotation of the prism 410 may be equal to or greater than the specified reference value. Images 1112 and 1115 acquired in the twelfth state ⑫ or the fifteenth state ⑮ may be rotated clockwise or counterclockwise. In this case, the object included in the images 1112 and 1115 may also be rotated differently from the actual shape. Unlike the images 1112 and 1115, regions of interest 1112a and 1115a before correction may have non-rotated shapes. Accordingly, left and right heights of the regions of interest 1112a and 1115a may be different from each other on the images 1112 and 1115. The processor 120 or the image signal processor 260 may set corrected regions of interest 1112b and 1115b by rotating the regions of interest 1112a or 1115a clockwise or counterclockwise by reflecting the first amount of rotation. The corrected regions of interest 1112b and 1115b may be rotated in the same direction and at the same angle as the images 1112 and 1115.

When the 3A (AE, AF, AWB) or face detection (FD) is performed by the correction of the regions of interest, data for an unnecessary background region is removed, and the performance (or reliability) of the 3A (AE, AF, AWB) or face detection (FD) function may be increased. For example, it is possible to prevent and/or reduce deterioration in tracking performance due to a change in the shape of a subject during object tracking.

For example, in FIG. 12, when a first region of interest 1210a is set by detecting a face 1201, the ratio of the unnecessary background region around the face 1201 is high, and thus the performance of 3A (AE, AF, AWB) or face detection (FD)-based functions may be decreased. The processor 120 or the image signal processor 260 may correct the first region of interest 1210a into a second region of interest 1210b by reflecting rotation of the prism 410 in the second direction (e.g., the pitch direction). In this way, the unnecessary background may be removed and the performance of 3A (AE, AF, AWB) or face detection (FD)-based functions may be improved.

The electronic device according to various embodiments disclosed herein may be one of various types of electronic devices. The electronic devices may include, for example, a portable communication device (e.g., a smartphone), a computer device, a portable multimedia device, a portable medical device, a camera, a wearable device, or a home appliance. According to an embodiment of the present disclosure, the electronic devices are not limited to those described above.

An electronic device (e.g., the electronic device 101 of FIG. 1 or the electronic device 301 of FIG. 3) according to various example embodiments may include: a display (e.g., the display module 160 in FIG. 1 or the display 310 in FIG. 3), a memory (e.g., the memory 130 of FIG. 1), a processor (e.g., the processor 120 of FIG. 1), and a foldable camera module (e.g., the camera module 180 of FIG. 1 or 2, or the folded/foldable camera module 350 of FIG. 3), the foldable camera module (e.g., the camera module 180 of FIG. 1 or 2, or the folded/foldable camera module 350 of FIG. 3) may include a lens unit including a lens (e.g., the lens unit 415 of FIG. 4a), a prism (e.g., the prism 410 in FIG. 4a) rotatable in a first direction or a second direction, a driving unit including a coil (e.g., the driving unit 420 of FIG. 4A) configured to move the prism (e.g., the prism 410 in FIG. 4A), a magnetic body (e.g., the magnetic body 440 of FIG. 4A) coupled to the prism (e.g., the prism 410 in FIG. 4a), a sensor unit including a sensor (e.g., the sensor unit 460 of FIG. 5) configured to detect a first amount of rotation of the prism (e.g., the prism 410 in FIG. 4A) in the first direction or a second amount of rotation thereof in the second direction, and an image sensor (e.g., the image sensor 480 of FIG. 4A) configured to generate an electrical signal using light passing through the lens unit (e.g., the lens unit 415 of FIG. 4A) and the prism (e.g., the prism 410 of FIG. 4A), wherein the processor (e.g., the processor 120 of FIG. 1) may be configured to: determine a first region of interest (ROI) for execution of a specified function using the foldable camera module (e.g., the camera module 180 of FIG. 1 or 2, or the folded/foldable camera module 350 of FIG. 3), determine the first amount of rotation or the second amount of rotation using a sensing value of the sensor unit (e.g., the sensor unit 460 of FIG. 5), and determine a second region of interest by correcting the first region of interest of the foldable camera module (e.g., the camera module 180 of FIG. 1 or 2 or the folded/foldable camera module 350 of FIG. 3) using the first amount of rotation or the second amount of rotation.

According to various example embodiments, the processor (e.g., the processor 120 of FIG. 1) may be configured to: recognize an external object and rotate the prism (e.g., the prism 410 of FIG. 4A) in the first direction or the second direction corresponding to a position of the external object.

According to various example embodiments, the processor (e.g., the processor 120 of FIG. 1) may be configured to: determine the first amount of rotation and the second amount of rotation by comparing first sensing data and second sensing data acquired through the sensor unit (e.g., the sensor unit 460 of FIG. 5) with a table stored in the memory (e.g., the memory 130 of FIG. 1).

According to various example embodiments, the processor (e.g., the processor 120 of FIG. 1) may be configured to: determine the first amount of rotation using first sensing data and second sensing data acquired through the sensor unit (e.g., the sensor unit 460 of FIG. 5) and determine the second amount of rotation using the second sensing data.

According to various example embodiments, the processor (e.g., the processor 120 of FIG. 1) may be configured to: determine the second region of interest by rotating the first region of interest corresponding to the first amount of rotation.

According to various example embodiments, the processor (e.g., the processor 120 of FIG. 1) may be configured to determine the second region of interest by changing a length or ratio of at least one side of the first region of interest corresponding to the second amount of rotation.

According to various example embodiments, the processor (e.g., the processor 120 of FIG. 1) may be configured to acquire data for executing the function using the second region of interest.

According to various example embodiments, the processor (e.g., the processor 120 of FIG. 1) may be configured to move the prism (e.g., the prism 410 of FIG. 4a) by operating the driving unit (e.g., the driving unit 420 of FIG. 4A) based on the data.

According to various example embodiments, the processor (e.g., the processor 120 of FIG. 1) may be configured to determine the second region of interest by background execution.

According to various example embodiments, the specified function may be one of settings related to 3A (automatic exposure (AE), automatic focus (AF), automatic white-balance (AWB)), object tracking (OT), or face detection-based photographing.

According to various example embodiments, the processor (e.g., the processor 120 of FIG. 1) may be configured to determine the second region of interest for all frames of image data acquired through the image sensor (e.g., the image sensor 480 of FIG. 4A).

According to various example embodiments, the sensor unit (e.g., the sensor unit 460 of FIG. 5) may include a first Hall sensor configured to detect a first amount of rotation, and a second Hall sensor and a third Hall sensor configured to detect a second amount of rotation.

According to various example embodiments, the processor (e.g., the processor 120 of FIG. 1) may be configured to determine the first region of interest by recognizing an external object.

According to various example embodiments, the processor (e.g., the processor 120 of FIG. 1) may be configured to display the first region of interest on the display (e.g., the display module 160 of FIG. 1 or the display 310 of FIG. 3), and to not display the second region of interest on the display (e.g., the display module 160 of FIG. 1 or the display 310 of FIG. 3).

An image processing method according to various example embodiments may be performed in an electronic device (e.g., the electronic device 101 of FIG. 1 or the electronic device 301 of FIG. 3), wherein the image processing method may include: determining a first region of interest (ROI) for execution of a specified function using a foldable camera module (e.g., the camera module 180 of FIG. 1 or 2, or the folded/foldable camera module 350 of FIG. 3) of the electronic device (e.g., the electronic device 101 of FIG. 1 or the electronic device 301 of FIG. 3), determining a first amount of rotation or a second amount of rotation of the foldable camera module (e.g., the camera module 180 in FIG. 1 or 2 or the folded/foldable camera module 350 in FIG. 3) using a sensing value of a sensor unit (e.g., the sensor unit 460 in FIG. 5) of the foldable camera module (e.g., the camera module 180 in FIG. 1 or 2 or the folded/foldable camera module 350 in FIG. 3), and determining a second region of interest by correcting the first region of interest of the foldable camera module (e.g., the camera module 180 of FIG. 1 or 2 or the folded/foldable camera module 350 of FIG. 3) using the first amount of rotation or the second amount of rotation.

According to various example embodiments, the determining of the first region of interest may include recognizing an external object and rotating the prism (e.g., the prism 410 of FIG. 4A) in a first direction or a second direction corresponding to a position of the external object.

According to various example embodiments, the determining of the first amount of rotation or the second amount of rotation may include determining the first amount of rotation and the second amount of rotation by comparing first sensing data and second sensing data acquired through the sensor unit (e.g., the sensor unit 460 of FIG. 5) with a table stored in a memory (e.g., the memory 130 of FIG. 1) of the electronic device (e.g., the electronic device 101 of FIG. 1 or the electronic device 301 of FIG. 3).

According to various example embodiments, the determining of the first amount of rotation or the second amount of rotation may include determining the first amount of rotation using first sensing data and second sensing data acquired through the sensor unit (e.g., the sensor unit 460 of FIG. 5) and determining the second amount of rotation using the second sensing data.

According to various example embodiments, the determining of the second region of interest may include determining the second region of interest by rotating the first region of interest corresponding to the first amount of rotation.

According to various example embodiments, the determining of the second region of interest may include determining the second region of interest by changing a length or ratio of at least one side of the first region of interest corresponding to the second amount of rotation.

It should be appreciated that various embodiments of the present disclosure and the terms used therein are not intended to limit the technological features set forth herein to particular embodiments and include various changes, equivalents, or replacements for a corresponding embodiment. With regard to the description of the drawings, similar reference numerals may be used to refer to similar or related elements. It is to be understood that a singular form of a noun corresponding to an item may include one or more of the things, unless the relevant context clearly indicates otherwise. As used herein, each of such phrases as "A or B," "at least one of A and B," "at least one of A or B," "A, B, or C," "at least one of A, B, and C," and "at least one of A, B, or C," may include any one of, or all possible combinations of the items enumerated together in a corresponding one of the phrases. As used herein, such terms as "1st" and "2nd," or "first" and "second" may be used to simply distinguish a corresponding component from another, and does not limit the components in other aspect (e.g., importance or order). It is to be understood that if an element (e.g., a first element) is referred to, with or without the term "operatively" or "communicatively", as "coupled with," "coupled to," "connected with," or "connected to" another element (e.g., a second element), the element may be coupled with the other element directly (e.g., wiredly), wirelessly, or via a third element.

As used in connection with various embodiments of the disclosure, the term "module" may include a unit implemented in hardware, software, or firmware, or any combination thereof, and may interchangeably be used with other terms, for example, "logic," "logic block," "part," or "circuitry". A module may be a single integral component, or a minimum unit or part thereof, adapted to perform one or more functions. For example, according to an embodiment, the module may be implemented in a form of an application-specific integrated circuit (ASIC).

Various embodiments as set forth herein may be implemented as software (e.g., the program 140) including one or more instructions that are stored in a storage medium (e.g., internal memory 136 or external memory 138) that is readable by a machine (e.g., the electronic device 101). For example, a processor (e.g., the processor 120) of the machine (e.g., the electronic device 101) may invoke at least one of the one or more instructions stored in the storage medium, and execute it, with or without using one or more other components under the control of the processor. This allows the machine to be operated to perform at least one function according to the at least one instruction invoked. The one or more instructions may include a code generated by a compiler or a code executable by an interpreter. The machine-readable storage medium may be provided in the form of a non-transitory storage medium. Wherein, the "non-transitory" storage medium is a tangible device, and may not include a signal (e.g., an electromagnetic wave), but this term does not differentiate between where data is semi-permanently stored in the storage medium and where the data is temporarily stored in the storage medium.

According to an embodiment, a method according to various embodiments of the disclosure may be included and provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smart phones) directly. If distributed online, at least part of the computer program product may be temporarily generated or at least temporarily stored in the machine-readable storage medium, such as memory of the manufacturer's server, a server of the application store, or a relay server.

According to various embodiments, each component (e.g., a module or a program) of the above-described components may include a single entity or multiple entities, and some of the multiple entities may be separately disposed in different components. According to various embodiments, one or more of the above-described components may be omitted, or one or more other components may be added. Alternatively or additionally, a plurality of components (e.g., modules or programs) may be integrated into a single component. In such a case, according to various embodiments, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

While the disclosure has been illustrated and described with reference to various example embodiments, it will be understood that the various example embodiments are intended to be illustrative, not limiting. It will be further understood by those skilled in the art that various changes in form and detail may be made without departing from the true spirit and full scope of the disclosure, including the appended claims and their equivalents. It will also be understood that any of the embodiment(s) described herein may be used in conjunction with any other embodiment(s) described herein.

What is claimed is:

1. An electronic device comprising:
   a display;
   memory;
   a processor comprising processing circuitry; and
   a camera,
   wherein the camera includes:
      a lens unit including a lens;
      a prism rotatable in a first direction or a second direction;
      a driving unit comprising at least one coil configured to move the prism;
      a magnetic body coupled to the prism;
      a sensor unit including a sensor configured to detect a first amount of rotation of the prism in the first direction or a second amount of rotation thereof in the second direction; and
      an image sensor configured to generate an electrical signal using light passing through the lens unit and the prism, wherein
   the processor is configured to:
      determine a first region of interest (ROI) for execution of a specified function using the camera;
      determine the first amount of rotation or the second amount of rotation using a sensing value of the sensor unit; and
      determine a second region of interest by correcting the first region of interest of the camera using the first amount of rotation or the second amount of rotation,
   wherein the sensor unit includes:
      a first Hall sensor configured to detect the first amount of rotation; and
      a second Hall sensor and a third Hall sensor configured to detect the second amount of rotation.

2. The electronic device of claim 1, wherein the processor is configured to:
   recognize an external object; and
   rotate the prism in the first direction or the second direction corresponding to a position of the external object.

3. The electronic device of claim 1, wherein the processor is configured to determine the first amount of rotation and the second amount of rotation by comparing first sensing data and second sensing data acquired through the sensor unit with a table stored in the memory.

4. The electronic device of claim 1, wherein the processor is configured to determine the first amount of rotation using first sensing data and second sensing data acquired through the sensor unit and determine the second amount of rotation using the second sensing data.

5. The electronic device of claim 1, wherein the processor is configured to determine the second region of interest by rotating the first region of interest corresponding to the first amount of rotation.

6. The electronic device of claim 1, wherein the processor is configured to determine the second region of interest by changing a length or ratio of at least one side of the first region of interest corresponding to the second amount of rotation.

7. The electronic device of claim 1, wherein the processor is configured to acquire data for executing the function using the second region of interest.

8. The electronic device of claim 7, wherein the processor is configured to move the prism by operating the driving unit based on the data.

9. The electronic device of claim 1, wherein the processor is configured to determine the second region of interest by background execution.

10. The electronic device of claim 1, wherein the specified function is one of settings related to 3A, including automatic exposure (AE), automatic focus (AF), and/or automatic white-balance (AWB), object tracking (OT), or face detection-based photographing.

11. The electronic device of claim 1, wherein the processor is configured to determine the second region of interest for all frames of image data acquired through the image sensor.

12. The electronic device of claim 1, wherein the processor is configured to determine the first region of interest by recognizing an external object.

13. The electronic device of claim 1, wherein the processor is configured to:
display the first region of interest on the display; and
not display the second region of interest on the display.

14. A method of image processing performed in an electronic device, the image processing method comprising:
determining a first region of interest (ROI) for execution of a specified function using a camera of the electronic device;
determining a first amount of rotation or a second amount of rotation of the camera using a sensing value of a sensor unit of the camera; and
determining a second region of interest by correcting the first region of interest of the camera using the first amount of rotation or the second amount of rotation,
wherein the sensor unit includes:
a first Hall sensor configured to detect the first amount of rotation; and
a second Hall sensor and a third Hall sensor configured to detect the second amount of rotation.

15. The method of claim 14, wherein the determining of the first region of interest includes recognizing an external object and rotating a prism in a first direction or a second direction corresponding to a position of the external object.

16. The method of claim 14, wherein the determining of the first amount of rotation or the second amount of rotation includes determining the first amount of rotation and the second amount of rotation by comparing first sensing data and second sensing data acquired through the sensor unit with a table stored in a memory of the electronic device.

17. The method of claim 14, wherein the determining of the first amount of rotation or the second amount of rotation includes determining the first amount of rotation using first sensing data and second sensing data acquired through the sensor unit and determining the second amount of rotation using the second sensing data.

18. The method of claim 14, wherein the determining of the second region of interest includes determining the second region of interest by rotating the first region of interest corresponding to the first amount of rotation.

19. The method of claim 14, wherein the determining of the second region of interest includes determining the second region of interest by changing a length or ratio of at least one side of the first region of interest corresponding to the second amount of rotation.

* * * * *